(12) United States Patent
Wiebe

(10) Patent No.: US 7,333,478 B2
(45) Date of Patent: Feb. 19, 2008

(54) METHODS AND APPARATUS FOR TRANSPORTING DIGITAL AUDIO-RELATED SIGNALS

(76) Inventor: Garth Wiebe, 3 Silver Hill Rd., Maynard, MA (US) 01754

( * ) Notice: Subject to any disclaimer, the term of this patent is extended or adjusted under 35 U.S.C. 154(b) by 956 days.

(21) Appl. No.: 10/436,785

(22) Filed: May 13, 2003

(65) Prior Publication Data

US 2003/0223409 A1    Dec. 4, 2003

Related U.S. Application Data

(60) Provisional application No. 60/384,244, filed on May 30, 2002.

(51) Int. Cl.
*H04L 12/66* (2006.01)
(52) U.S. Cl. ............... 370/352; 370/353; 370/354; 370/355; 370/356; 370/401
(58) Field of Classification Search ........... 370/352, 370/353, 354, 355, 356, 401
See application file for complete search history.

(56) References Cited

U.S. PATENT DOCUMENTS

| | | | |
|---|---|---|---|
| 5,297,181 A | 3/1994 | Barr et al. | |
| 5,483,528 A | 1/1996 | Christensen | |
| 5,487,067 A | 1/1996 | Matsushige | |
| 5,526,353 A | 6/1996 | Henley et al. | |
| 5,596,578 A | 1/1997 | Cunningham | |
| 6,044,307 A | 3/2000 | Kamiya | |
| 6,069,878 A | 5/2000 | Christensen | |
| 6,181,707 B1 | 1/2001 | Erickson et al. | |
| 6,240,084 B1 * | 5/2001 | Oran et al. ........... | 370/352 |
| 6,243,373 B1 * | 6/2001 | Turock ............... | 370/352 |
| 6,259,691 B1 * | 7/2001 | Naudus ............... | 370/352 |
| 6,289,025 B1 * | 9/2001 | Pang et al. ............ | 370/458 |
| 6,363,065 B1 * | 3/2002 | Thornton et al. ...... | 370/352 |
| 6,542,497 B1 * | 4/2003 | Curry et al. .......... | 370/352 |

(Continued)

OTHER PUBLICATIONS

Oxford Technologies, "SuperMac Super Multi-Channel Audio Connection," http://www.sonyoxford.co.uk/pub/supermac/index.html; printed Mar. 7, 2004, pp. 1-2.

(Continued)

*Primary Examiner*—Quynh H. Nguyen
(74) *Attorney, Agent, or Firm*—McGuinness & Manaras LLP

(57) ABSTRACT

Methods and apparatus for transporting digital audio-related signals over point-to-point, non-circuit-switched, non-packet-based, local area connections. In one example, multiple digital audio-related signals are combined as a time division multiplexed (TDM) serial bit stream. In addition to the one or more multiplexed digital audio-related signals, the TDM serial bit stream also may be encoded with other information that pertains to one or more of the digital audio-related signals being multiplexed (e.g., data rates of the signals, various data type or status information, timing or other synchronization information, etc.). In one aspect, the TDM serial bit stream is transmitted and received via conventional packet-based network physical layer transceivers (e.g., Ethernet transceivers) that are particularly configured and controlled to transmit and receive essentially continuous bit streams rather than data packets. In another aspect, a "digital audio snake" comprising multiple terminal units that each employs one or more packet-based transceivers is implemented by stringing together two or more such terminal units as a daisy chain connected by a communication medium.

58 Claims, 14 Drawing Sheets

U.S. PATENT DOCUMENTS

| | | | |
|---|---|---|---|
| 6,570,890 B1* | 5/2003 | Keenan et al. | 370/493 |
| 7,042,848 B2* | 5/2006 | Santiago et al. | 370/253 |
| 2003/0050989 A1 | 3/2003 | Marinescu et al. | |

OTHER PUBLICATIONS

Sony BPRL Pro-Audio R&D, "MAC-DSD Multi-Channel Audio Connection for DSD Protocol Specification (Preliminary)," ver. 1.1, pp. 1-23, Nov. 1, 2002.

Digigram, "Networked Audio Devices and Technologies," http://www.digigram.com/products/by_category.html, (Sep. 16, 2003), pp. 1-2.

Digigram, "EtherSound ES8in/8out," http://www.digigram.com/products/getinfo.html, (Sep. 16, 2003), pp. 1-2.

Digigram, "Exaudi HitPlayer," http://www.digigram.com/products/getinfo.html, (Sep. 16, 2003), pp. 1-2.

Digigram, "Exaudi Platform (former mpX Platform)," http://www.digigram.com/products.getinfo.html, (Sep. 16, 2003), p. 1.

Digigram. "NCX Network Audio Terminals," http://www.digigram.com/products/getinfo.html, (Sep. 16, 2003), pp. 1-2.

Digigram, "Audio Manager (including NCX Suite)," http://www.digigram.com/products/getinfo.html, (Sep. 16, 2003), pp. 1-2.

Digigram, "EtherSound," http://www.digigram.com/products/getinfo.html, (Sep. 16, 2003), pp. 1-2.

Digigram, "EtherSound ESnet Module," http://www.digigram.com/products/getinfo.html, (Sep. 16, 2003), pp. 1-2.

Digigram, "miXart 8 CN," http://www.digigram.com/products/getinfo.html, (Sep. 16, 2003), pp. 1-2.

Otari, Inc., OTARI, LW50 Lightwinder Colosseum Series product brochure, Part No. 00000, 2 pages, 1999.

Otari, Inc., product information from www.otari.com, 11 pages, May 27, 2003.

CobraNet, Background, Specifications and Terminology from www.peakaudio.com, 5 pages, May 15, 2003.

CobraNet, Real Time Audio Distribution Via Ethernet, User Manual, 144 pages, Apr. 21, 2003.

Aviom, Inc., "Welcome to the Home of Aviom, Inc.", http://aviominc.com/index.html, (Mar. 17, 2003).

Aviom, "Frequently Asked Questions", http://aviominc.com/faq.html, (Mar. 17, 2003), pp. 1-5.

Aviom, Inc., "Personal Monitor Mixing System", (2002), pp. 1-4.

Aviom, Inc., "A-16D A-Net Distributor", Part No. 9301 1002 0001 (2003), pp. 1-16.

Aviom, Inc., "A-16 Personal Monitor Mixing System: User Guide", Part No. 9301 1001 01 (2002), pp. 1-62.

Audio Engineering Society, Inc., "AES Information Document for Digital Audio Engineering—Transmission of AES3 Formatted Data by Unbalanced Coaxial Cable", (2001), pp. 1-23.

Audio Engineering Society, Inc., "AES Recommended Practice for Digital Audio Engineering—Serial Transmission Format for Two-Channel Linearly Represented Digital Audio Data", (May 25, 2001), pp. 1-36.

Audio Engineering Society, Inc., "AES Recommended Practice—for Digital Audio Engineering—Serial Multichannel Audio Digital Interface (MADI)", (Jan. 30, 1999), pp. 1-12.

Audio Engineering Society, Inc., "AES Information Document for Digital Audio Engineering—Engineering Guidelines for the Multichannel Audio Digital Interface (MADI) AES10", (Dec. 3, 2000), pp. 1-8.

Intel, "3.3V Dual-Speed Fast Ethernet Transceiver Datasheets—LXT972A", pp. 13, 30-31, and 42-43.

Julian Dunn, Audio Precision: "The AES3 and IEC60958 Digital Interface", Technote 26, (2001), pp. 1-28.

Juszkiewicz et al., This is Magic Engineering Specification: "Media-Accelerated Global Information Carrier", http://magic.gibson.com/specification.html and http://magic.gibson.com/thisismagic.html, (Jan. 21, 2000) Gibson Guitar Corporation, pp. 1-5.

BSS Audio Soundweb: "It's Time to Look at the Future of Your Facility's Sound System", http://bssaudio.com/soundweb/mainpage.html, (Jan. 21, 2000).

BSS Audio Soundweb: "The Soundweb System—Overview", http://www.bassaudio.com/soundweb/overview.html, (Jan. 21, 2000), pp. 1-2.

BSS AudioSoundweb: "Soundweb for Consultants and Contractors", http://www.bassaudio.com/soundweb/overvw2.html, (Jan. 21, 2000), pp. 1-2.

BSS Audio Soundweb: "Soundweb Detailed Technical Reference", http://www.bssaudio.com/soundweb/techref.html, (Jan. 21, 2000), pp. 1-2.

Juszkiewicz et al., Magic Engineering Specification: "Media-Accelerated Global Informaion Carrier", (Sep. 2001), Gibson Guitar Corporation, pp. 1-62.

* cited by examiner

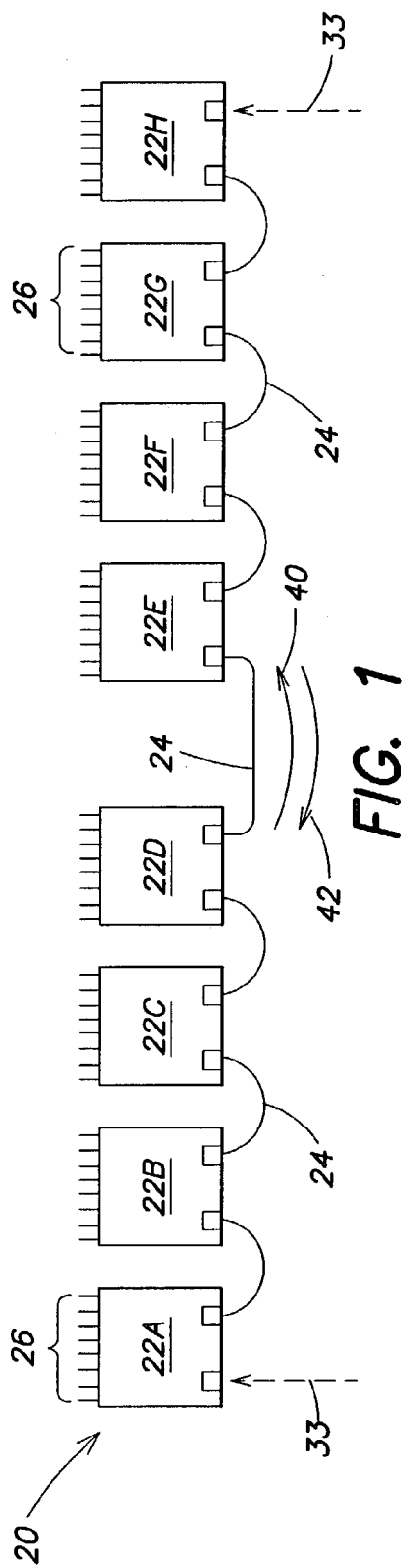
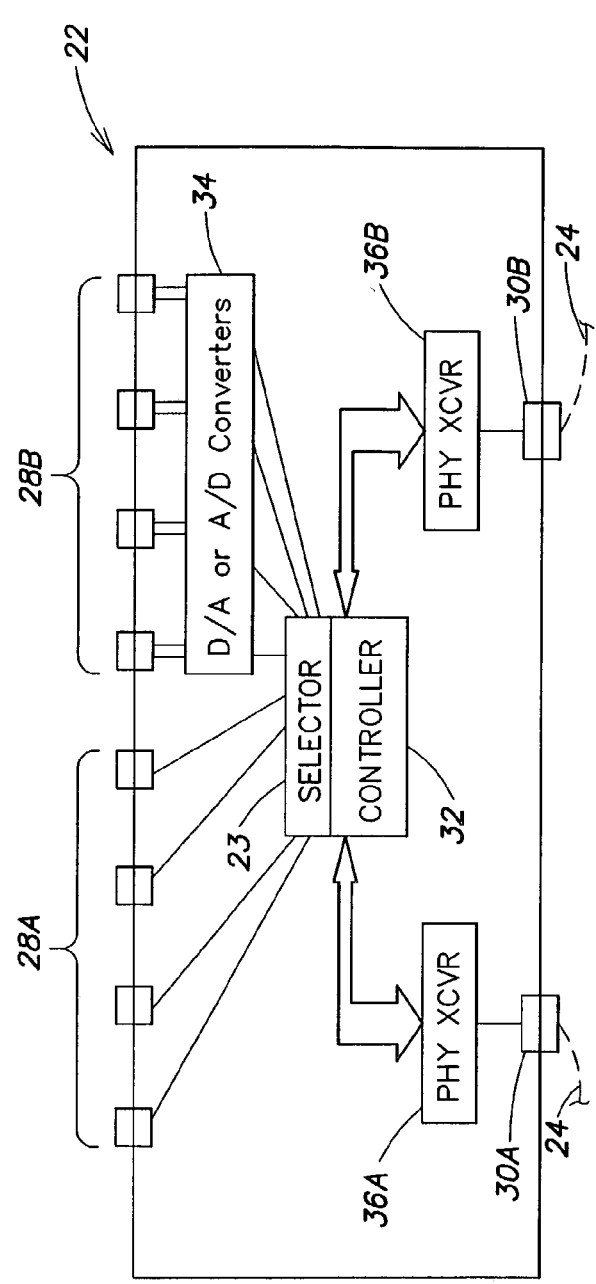
FIG. 1
FIG. 2 under 35 U.S.C.
METHODS AND APPARATUS FOR TRANSPORTING DIGITAL AUDIO-RELATED SIGNALS

CROSS-REFERENCE TO RELATED APPLICATION

This application claims the benefit, under 35 U.S.C. §119(e), of U.S. Provisional Application Ser. No. 60/384,244, filed May 30, 2002, entitled "Methods and Apparatus for Transporting Digital Audio Signals."

FIELD OF THE INVENTION

The present invention relates generally to transporting digital audio-related signals, for example, in live sound reproduction and/or recording environments.

BACKGROUND

In the professional audio industry, often multiple audio or audio-related signals originating from different sources (e.g., microphones, acoustic instrument pick-ups, electronic instruments, various signal processing equipment, etc.) need to be directed to various destinations (e.g., one or more mixing consoles, recording equipment, amplification equipment, signal processing equipment and the like). Conventionally, many audio signals originate as analog signals which are transferred over traditional copper wire cables. Other types of audio or audio-related signals may be generated by various equipment as digital signals that also may be transferred over conventional wire or fiber optic cables.

For many decades, the professional audio industry has employed (e.g., for live entertainment sound reproduction or recording environments) large numbers of individual copper wire cables, or bundled groups of multiple copper cables, commonly referred to as "audio snakes," to transport multiple audio signals. These cables or snakes are transported from venue to venue, or built into permanent installations (e.g., concert halls, theatres, recording studios) to accommodate various audio needs. In some cases, the individual audio signal carriers are accessed by a "patch panel" at some central location, from which various audio equipment are coupled to the cables, and audio connections are particularly configured manually by an operator.

In recent years, the professional audio industry has been exploring the concept of transporting digital audio signals using conventional network techniques (e.g., Ethernet) and developing products in this area. These products are designed to serve as an alternative to conventional methods of transferring audio signals over traditional copper wire-based cables. In particular, such products generally are directed to transporting digital audio signals over local area Ethernet connections or scaled-back versions of store-and-forward packet-based networks that integrate computer software control with network technology. Typically, these products are both complex and expensive, and are aimed generally at providing potentially viable signal transport solutions for "high-end" installations and venues.

In general, proposed solutions for transporting digital audio signals are based on transferring data packets over a network topology. As a result, one issue germane to this technology is that of signal "latency," or how long audio signals encoded as data packets take to get from a particular source of origination to a particular destination. Especially in connection with live sound reproduction, any significant signal latency caused by the network configuration is an undesirable artifact of signal transport.

SUMMARY

Methods and apparatus according to various embodiments of the present invention provide economical and convenient solutions for transporting multiple digital audio-related signals over commonly available media, without requiring specialized software, network management tools or equipment, or computer control, as in conventionally proposed techniques. Exemplary implementations of the invention involve methods and apparatus for transporting digital audio-related signals over point-to-point, non-circuit-switched, non-packet-based, local area connections, wherein the transport media may be provided by conventional cables such as category 5 (CAT5) cables (e.g., unshielded or shielded twisted pairs of wires), fiber optic cables, or wireless communication links.

For example, one embodiment of the invention is directed to a method for transporting at least one digital audio-related signal, comprising acts of a) controlling at least one packet-based physical layer transmitter so as to generate at least one time division multiplexed (TDM) serial bit stream and, b) transporting a representation of the at least one digital audio-related signal in at least one assigned time slot channel of the at least one TDM serial bit stream.

Another embodiment of the invention is directed to a method for transporting at least one digital audio-related signal, comprising acts of a) controlling at least one packet-based physical layer receiver so as to receive at least one TDM serial bit stream that includes a representation of the at least one digital audio-related signal in at least one assigned time slot channel, b) recovering the representation of the at least one digital audio-related signal from the at least one received TDM serial bit stream, and c) generating the at least one digital audio-related signal based on the recovered representation of the at least one second digital audio-related signal.

Another embodiment of the invention is directed to an apparatus for transporting at least one digital audio-related signal, comprising at least one packet-based physical layer transmitter, and at least one controller configured to control the at least one packet-based physical layer transmitter so as to generate at least one time division multiplexed (TDM) serial bit stream. The controller further is configured to place a representation of the at least one digital audio-related signal in at least one assigned time slot channel of the at least one TDM serial bit stream.

Another embodiment of the invention is directed to an apparatus for transporting at least one digital audio-related signal, comprising at least one packet-based physical layer receiver configured to receive at least one TDM serial bit stream that includes a representation of the at least one digital audio-related signal in at least one assigned time slot channel, and at least one controller configured to recover the representation of the at least one digital audio-related signal from the at least one received TDM serial bit stream and generate the at least one digital audio-related signal based on the recovered representation.

Another embodiment of the invention is directed to an apparatus for transporting at least one digital audio-related signal, comprising at least first and second terminal units. In this embodiment, the first terminal unit comprises at least one first controller configured to receive at least one digital audio-related signal and assign the at least one digital audio-related signal to at least one time slot channel of a time division multiplexed (TDM) serial bit stream. The first terminal unit further comprises at least one packet-based physical layer transmitter, responsive to the at least one first controller and configured to generate the TDM serial bit stream, and at least one first communication port, coupled to the at least one transmitter and configured to output the TDM serial bit stream.

The second terminal unit comprises at least one second communication port configured to receive the TDM serial bit stream, and at least one packet-based physical layer receiver, coupled to the at least one second communication port and configured to process the received TDM serial bit stream and output information based on the received TDM serial bit stream. The second terminal unit further comprises at least one second controller, coupled to the at least one receiver and configured to process the information so as to regenerate the at least one digital audio-related signal.

The apparatus of this embodiment further comprises at least one communication medium coupled to the at least one first communication port and the at least one second communication port to transport the TDM serial bit stream. Examples of communication media include wire cables (twisted pair, CAT5), fiber optics, and wireless links.

For purposes of this disclosure, the term "digital audio-related signal" refers to a digital signal (e.g., including binary logic high and logic low states) that relates in some way to audio (sound production, processing, recording, re-production, synchronization, etc.). For example, a digital audio-related signal may be a sampled analog audio signal that is encoded in digital form using a particular protocol. Alternatively, a digital audio-related signal may be related to the control of audio equipment or other instrumentation relating to audio (e.g., a MIDI signal, a SMPTE time code, etc.).

Additionally, the term "packet-based" refers to a conventional device that is designed for (i.e., intended for use in) a standard local area network in which data is arranged in packets according to a predetermined protocol and transported using a packet store-and-forward scheme. One example of a packet-based device is given by an Ethernet transceiver.

It should be appreciated the all combinations of the foregoing concepts and additional concepts discussed in greater detail below are contemplated as being part of the inventive subject matter disclosed herein. In particular, all combinations of claimed subject matter appearing at the end of this disclosure are contemplated as being part of the inventive subject matter.

BRIEF DESCRIPTION OF THE DRAWINGS

FIG. 1 is a diagram of a "digital audio snake" according to one embodiment of the invention;

FIG. 2 is a diagram of a terminal unit of the digital audio snake of FIG. 1, according to one embodiment of the invention;

DETAILED DESCRIPTION

1. Overview

Figure 3:
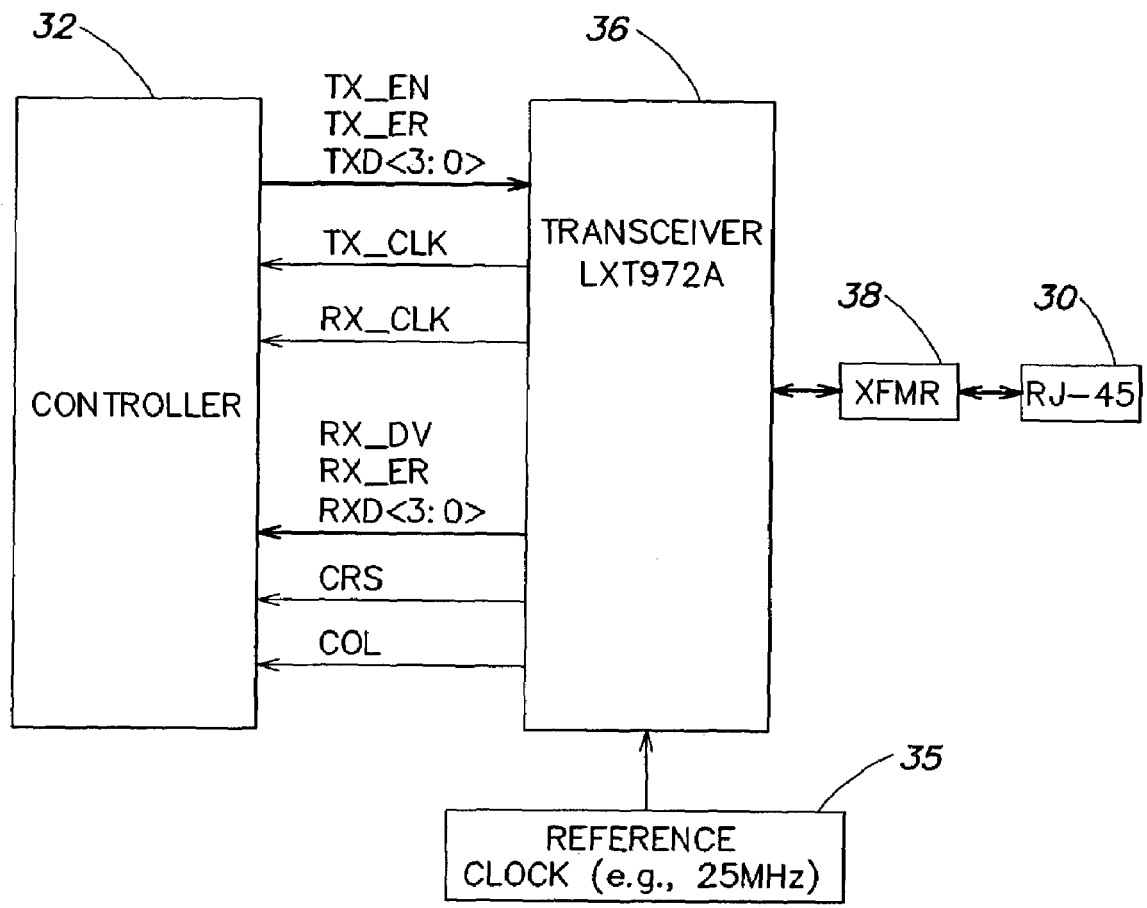
FIG. 3 is a diagram of a portion of the terminal unit of FIG. 2, showing one example of a packet-based transceiver and associated connections, according to one embodiment of the invention.

Applicant has recognized and appreciated that more convenient and less expensive techniques for transporting multiple digital audio-related signals, having a wide range of applicability, may be realized as viable and effective alternatives to current techniques for transporting digital audio-related signals. In particular, Applicant has recognized and appreciated that network-oriented packet-based implementations for transporting digital audio signals often are unnecessarily complex and expensive for many audio applications. Accordingly, the present invention is directed generally to alternative methods and apparatus for transporting digital audio-related signals, as described in detail below.

In particular, in one embodiment of the invention, unlike conventional packet-based techniques, multiple digital audio-related signals are combined as a time division multiplexed (TDM) serial bit stream. In one aspect of this embodiment, in addition to the one or more multiplexed digital audio-related signals, the TDM serial bit stream also may be encoded with other information that pertains to one or more of the digital audio-related signals being multiplexed (e.g., data rates of the signals, various data type or status information, timing or other synchronization information, etc.).

For example, in one aspect of this embodiment, respective data rates and types of multiple digital audio signals to be multiplexed are determined and encoded into the TDM serial bit stream along with the digital audio signals. In another aspect of this embodiment, the TDM serial bit streams are transmitted and received via conventional packet-based network physical layer transceivers (e.g., Ethernet transceivers) that are particularly configured to transmit and receive essentially continuous data streams rather than data packets. The TDM bit streams may be transported between transceivers using one or more conventional CAT5 cables, fiber optic cables, or wireless links, for example. In yet another aspect, a TDM serial bit stream may be generated at a first location and received and decoded at a second location without utilizing a master clock that is common to the first and second locations, and without transmitting any timing or synchronization information (i.e., feedback) from the second location to the first location.

In another aspect of the invention, methods and apparatus are particularly configured to accomplish transport of digital audio-related signals with a latency that is significantly reduced from that commonly encountered in conventional packet-based digital audio transport techniques, thereby providing a highly effective signal transport solution for a variety of audio applications (e.g., live sound reproduction and recording). In particular, one embodiment of the invention is directed to methods and apparatus for transporting one or more digital audio-related signals from a first node to a second node with a latency of approximately 10 microseconds or less to over a distance of approximately 100 meters. More generally, in one aspect of this embodiment, one or more digital audio-related signals are transported from node to node with a latency significantly less than 250 microseconds.

Yet another embodiment of the invention is directed to one or more components that may be provided separately or in combination to constitute a "digital audio snake" according to various concepts discussed further below. For example, such a digital audio snake apparatus may comprise a first terminal unit (or first "node") including a first controller configured to receive and process one or more digital audio-related signals. In particular, the first controller is configured to assign the one or more digital audio-related signals to one or more time slot channels of a time division multiplexed (TDM) serial bit stream. The first terminal unit also includes one or more transmitters coupled to the first controller and particularly configured to generate the TDM serial bit stream, and one or more first communication ports coupled to the transmitter(s) and configured to output the TDM serial bit stream.

The digital audio snake apparatus of this embodiment also includes a second terminal unit (or second "node") including one or more second communication ports configured to receive the generated TDM serial bit stream, and one or more receivers, coupled to the second communication port(s) and configured to process the TDM serial bit stream and output information based on the processed TDM serial bit stream. The second terminal unit also comprises a second controller coupled to the one or more receivers and configured to process the information so as to recover the one or more digital audio-related signals. The digital audio snake apparatus also comprises at least one communication medium coupled to the one or more first communication ports and the one or more second communication ports to transport the TDM serial bit stream.

In one aspect of this embodiment, the first and second terminal units may be manufactured and sold separately as respective individual units. Alternatively, two or more terminal units, along with a physical communication medium (e.g., wire or fiber optic cable), may be packaged and sold together as a digital audio snake apparatus. It should also be appreciated from the discussion following below that, in one aspect, the digital audio snake apparatus may be considered "modular" in nature, in that users may add or remove terminal units to the apparatus as audio needs change or evolve over time.

In other aspects of this embodiment, the communication medium used for the digital audio snake apparatus may include one or more CAT5 cables, one or more fiber optic cables, and/or one or more wireless links, wherein the various communication ports are configured accordingly. In yet another aspect of this embodiment, the transmitter(s) and receiver(s) of the respective terminal units may be physical layer packet-based transceivers (e.g., 100 megabit/sec or 1 gigabit/sec Ethernet transceivers) that are particularly configured to transmit and receive the TDM serial bit streams rather than data packets, as discussed further below.

Additionally, in yet another aspect of this embodiment, the controllers of the respective terminal units may be realized as one or more state machines/synchronization stages implemented in programmable logic (e.g., ALTERA™ APEX 20K series FPGAs) to accomplish the various controller functions discussed herein. For example, via programmable logic, the controllers may be configured to sample digital audio-related signals input to the terminal units and appropriately encode the signals onto a TDM serial bit stream, in some cases together with other information that relates to the digital audio-related signals. The controllers also may be configured to process a received TDM serial bit stream and recover the digital audio-related signals. In general, according to one aspect, the controllers may be configured to particularly process the digital audio-related signals and control the transmitters/receivers/transceivers so as to address various timing and synchronization issues that arise from dealing with multiple clock domains throughout a signal chain.

Following below are more detailed descriptions of various concepts related to, and embodiments of, methods and apparatus for transporting digital audio-related signals according to the present invention. It should be appreciated that various aspects of the invention as introduced above and discussed in greater detail below may be implemented in any of numerous ways, as the invention is not limited to any particular manner of implementation. Examples of specific implementations and applications are provided for illustrative purposes only.

2. Exemplary Embodiments

Various types of conventional Ethernet physical layer transceivers may be configured to transport full duplex data over inexpensive twisted pair (e.g., category 5 or "CAT5") cables or similar Ethernet cables, fiber optic cables or wireless communication links. Applicant has recognized and appreciated that the data transport capability of such transceivers (e.g., 100 Mega-bits per second ("Mbs") for conventional 100 BASE Ethernet transceivers, or 1 Giga-bits per second ("Gbs") for conventional 1000BASE Ethernet transceivers) corresponds to large numbers of channels of digital audio signals (e.g., CD-quality audio) that essentially may be transmitted simultaneously in each direction. Accordingly, instead of using such transceivers to implement conventional packet/frame store and forward techniques, one embodiment of the present invention employs and particularly configures packet-based transceivers to transmit and receive streams of time division multiplexed (TDM) data in essentially continuous sequences of bit frames. It should be readily appreciated that the concept of using packet-based transceivers to transport data in TDM bit streams constitutes a significantly different use of these transceivers, as they were neither designed nor intended to be used in this fashion.

According to one embodiment of the invention as shown in FIG. 1, a "digital audio snake" 20 comprising multiple digital audio signal terminal units (i.e., "nodes") 22A-22H that each employs one or more particularly configured packet-based transceivers is implemented by stringing together two or more such terminal units as a "daisy chain" connected by a communication medium 24 (e.g., one or more CAT5 cables, fiber optic cables, and/or wireless links). Although FIG. 1 illustrates eight terminal units constituting the digital audio snake 20, it should be appreciated that the invention is not limited in this respect, as a digital audio snake according to various embodiments may be made up of virtually any number of terminal units. In one aspect, adjacent terminal units may be separated by up to 100 meters, such that multiple terminal units connected together may cover an appreciably significant distance.

In the digital audio snake 20 of FIG. 1, each of the terminal units 22A-22H may be configured to receive as inputs and/or transmit as outputs one or more digital audio-related signals and/or analog signals (represented generally in FIG. 1 by the reference character 26). These input and/or output signals are processed by the terminal units to multiplex the signal(s) on and/or recover the signal(s) from one or more TDM serial bit streams 40 and 42 that are transported from terminal unit to terminal unit via the communication medium 24. In particular, at each terminal unit in the daisy chain (depending on the particular configuration of the terminal unit as discussed further below), information relating to one or more audio-related signals input to the terminal unit may be placed on one or more TDM streams for transport to one or more other terminal units. Similarly, information encoded on one or more of the TDM streams may be recovered from the TDM stream(s) at a given terminal unit to provide one or more regenerated audio-related signal outputs from the terminal unit.

In this manner, it should be appreciated that information relating to an audio-related signal input to a given terminal unit may be transported to one or more other terminal units of the daisy chain, and the information recovered and processed to regenerate the audio-related signal at the one or more other terminal units. Moreover, the one or more other terminal units at which the audio-related signal is regenerated need not be adjacent units in the daisy chain; for example, in one embodiment, an audio-related signal input to the terminal unit 22B shown in FIG. 1 may be transported on the TDM streams 40 and 42 to, and regenerated as an output from, one or more of the terminal units 22A, 22D, 22E and 22H. Similarly, another audio-related signal input to the terminal unit 22G may be transported to, and regenerated as an output from, one or more of the terminal units 22F, 22B and 22A. It should be appreciated from the foregoing example that a virtually limitless number of signal transport configurations is possible according to various embodiments of the invention, and that the particular example given above is primarily for purposes of illustration.

FIG. 2 is a diagram illustrating an example of one terminal unit 22 of the digital audio snake 20 shown in FIG. 1. In the example of FIG. 2, the terminal unit 22 may include a plurality of digital input and/or output audio connectors 28A. The terminal unit 22 also may include a plurality of analog audio input and/or output audio connectors 28B that are coupled to one or more conventional analog-to-digital (A/D) or digital-to-analog (D/A) converters 34. Although four digital audio connectors 28A and four analog audio connectors 28B are shown in FIG. 2 for purposes of illustration, it should be appreciated that the invention is not limited in this respect, as different numbers and types of digital and/or analog connectors may be employed in a given terminal unit. In particular, according to various embodiment discussed further below, a given terminal unit may be configured in any of a variety of ways, examples of which include, but are not limited to, all digital inputs, all analog inputs, mixed digital/analog inputs, all digital outputs, all analog outputs, mixed digital/analog outputs, mixed inputs and outputs of different numbers and different types, etc.

As shown in FIG. 2, the terminal unit 22 may include a signal selector 23 coupled to the connectors 28A and/or 28B if multiple input and/or output audio-related signals are to be processed by the terminal unit. In particular, the signal selector 23 is configured to facilitate the routing of one or more input audio-related signals for multiplexing onto a TDM bit stream transmitted by the terminal unit, and/or the routing of one or more output audio-related signals to be recovered from a TDM bit stream received by the terminal unit and provided as one or more audio-related outputs by the terminal unit. Exemplary implementations for the signal selector 23 are discussed further below in connection with FIGS. 4, 4A and 4B.

The terminal unit 22 of FIG. 2 also includes at least one controller 32 that is configured to sample one or more selected digital audio-related input signals (either received directly as digital signals via the audio connectors 28A, or received as analog signals via the connectors 28B, which analog signals are converted to digital signals by one or more A/D converters 34). The controller 32 processes the sampled signal(s) so that they may be multiplexed onto a TDM serial bit stream. The controller 32 also controls one or more packet-based physical layer transceivers 36A and 36B that are particularly configured to transmit to other units one or more TDM serial bit streams including the multiplexed audio-related signals. As shown in FIG. 2, the terminal unit 22 also includes one or more connectors or ports 30A and 30B to facilitate coupling the transceivers to the communication medium or media used to interconnect multiple terminal units and transport one or more TDM bit streams.

In another aspect of this embodiment, the controller 32 and one or more of the transceivers 36A and 36B also are configured to process one or more TDM serial bit streams received from one or more other terminal units so as to recover respective digital audio-related signals that are multiplexed onto the received TDM bit stream(s). One or more of the recovered digital audio-related signals may be output directly from the terminal unit via one or more of the connectors 28A, or optionally may be converted to an analog signal (by one or more D/A converters 34) and output by the terminal unit via one or more of the connectors 28B.

In one embodiment, the controller 32 shown in FIG. 2 may be realized as one or more state machines/synchronization stages implemented in programmable logic. Examples of programmable logic suitable for purposes of the present invention include, but are not limited to, ALTERA™ APEX 20K series FPGAs. In addition to multiplexing digital audio-related signals for transmission on a TDM bit stream and recovering digital audio-related signals from a received TDM bit stream, the controller 32 also may be configured via programmable logic (e.g., the state machines/synchronization stages may be programmed to execute appropriate algorithms) to particularly process the digital audio-related signals and control the transmitters/receivers/transceivers so as to address various timing and synchronization issues that arise from dealing with multiple clock domains throughout a signal chain, as discussed further below.

In one aspect of the embodiment shown in FIG. 2, one or more of the physical layer transceivers 36A and 36B employed in the terminal unit 22 may be a conventional 100

BASE Ethernet transceiver, as exemplified by the Intel LXT972A shown in FIG. 3. In FIG. 3, a generalized transceiver 36 (that may be used for one or both of the transceivers 36A and 36B of FIG. 2) is shown connected to a port 30 via a transformer 38. It should be appreciated, however, that the invention is not limited in this respect, as other types of transceivers may be employed. For example, a 1000 BASE Ethernet transceiver alternatively may be employed, as well as fiber, wireless or other media-based versions of these transceivers. As should also be readily appreciated, the rate of a TDM serial bit stream transported over the communication medium may be determined by the one or more transceivers 36 employed in the terminal unit 22. For example, the rate of a 100 BASE transceiver typically is 100 Mbs, whereas the rate of a 1000 BASE transceiver typically is 1 Gbs (1000 Mbs).

It should also be appreciated that a given transceiver 36 may be particularly designed to transport data via a port 30 over various types of communication media (e.g., twisted pair or CAT5 cable, fiber optic cable, wireless links). The type of connector used for the port 30 also may be determined by the type of communication medium employed. For example, with reference again to FIG. 2, in one embodiment in which one or more CAT5 cables are used for the communication medium, the ports 30A and 30B may be provided by conventional RJ45 connectors (in one aspect, the port 30A may be provided by a male connector, and the port 30B may be provided by a female connector). Similarly, in another embodiment in which one or more fiber optic links are used for the communication medium, the port 30A may be provided by one fiber connector, and the port 30B may be provided by another fiber connector.

Additionally, it should be appreciated that the controller 32 shown in FIG. 2 may be particularly configured to process a wide variety of digital and/or analog audio-related signals input to and output from the terminal unit 22, according to various embodiments of the invention. Examples of different types of audio signals (e.g., different signal protocols/formats) that may be processed by the terminal unit 22 according to various embodiments include, but are not limited to, standard analog audio signals (for which the connectors 28B may be provided by RCA-type or XLR-type connectors, for example), AES3 or IEC60958 (hereafter collectively referred to as "IEC 958") digital audio signals, Audio Engineering Society/European Broadcast Union (AES/EBU) digital audio signals (XLR-type connectors), Sony/Philips Digital Interface (S/PDIF) digital audio signals (RCA-type or BNC-type connectors), Tascam Digital InterFace (TDIF™) digital audio signals (multi-pin connectors), Toshiba link (TOSlink™) digital audio signals (optical connectors), and Alesis Digital Audio Tape (ADAT®) digital audio signals (optical connectors). Examples of digital signals related to audio that also may be processed by (i.e., input to and output from) the terminal unit 22 include, but are not limited to, MIDI signals, SMPTE time code signals, and other clock-related signals.

As discussed above, according to one embodiment, analog audio signals input to or output from the terminal unit 22 may be converted by conventional A/D or D/A converters 34, as shown in FIG. 2, such that the controller 32 of the terminal unit 22 processes all signals in a digital format. Alternatively, according to another embodiment, an operator may employ a variety of appropriate conventional A/D or D/A converters external to the terminal unit 22 (not shown in FIG. 2), such that analog audio signals are converted externally and all digital audio signals are input to and output from the terminal unit 22. Also, it should be appreciated that the types and number of audio-related signal connections into and out of a given terminal unit is not limited according to the present invention, and may be determined in part by the data rates of the respective signals to be processed and the rates of the transceivers employed in the terminal units, as discussed further below. With reference again to FIG. 1, it should also be appreciated that different terminal units of the digital audio snake 20 may have different numbers and/or types of audio-related signal inputs and/or outputs.

According to one embodiment of the digital audio snake 20 shown in FIG. 1, the controllers of each terminal unit also are configured to identify if they reside in "end node" terminal units of the daisy chain configuration. In one aspect, the controllers may accomplish this by determining, for example, if the terminal unit in which they reside has an "open" port (i.e., a port that is not connected to any active communication medium). This is illustrated in FIG. 1 by the terminal units 22A and 22H, each of which has an open port 33. An exemplary algorithm employed by a controller to determine its status as an "end node controller" is discussed in detail below in connection with FIG. 6A.

Once a controller determines that it resides in an end node (or if there is a power loss requiring a reset), the end node controller is configured to then control the physical layer transceiver of its terminal unit that is coupled to the "active" port (i.e., the port connected to an active communication medium) to initiate and essentially continuously propagate a TDM serial bit stream. It should be appreciated that if each end node controller of the digital audio snake 20 shown in FIG. 1 initiates a TDM serial bit stream as described above, two counter-propagating serial TDM serial bit streams 40 and 42 result, moving in opposite directions along the daisy chain configuration (i.e., starting from each end node of the digital audio snake apparatus). Each of these counter-propagating TDM serial bit streams is repeated as it travels from terminal unit to terminal unit until it reaches an opposite end of the daisy chain configuration.

While the TDM bit streams are being repeated, each terminal unit may insert multiplexed audio-related data into, and/or retrieve multiplexed audio-related data out of, appropriate designated time slot channels of the TDM bit streams. In some cases, a given terminal unit merely may pass on a TDM bit stream essentially as received, without placing any data into or recovering any data from the stream, depending on the state of the signal selector 23 shown in FIG. 2. These concepts are discussed in greater detail below in connection with FIGS. 6A, 6B, 7A and 7B.

In view of the foregoing, it should be appreciated that according to one embodiment of the invention, a conventional Ethernet or other packet-based physical layer transceiver (e.g., see FIG. 3), that is designed and intended to transmit and receive individually disconnected and indeterminately spaced data packets using Carrier Sense Multiple Access with Collision Detection (CSMA/CD), can be made to essentially continuously transmit a TDM bit stream including a sequence of frames. In this manner, packet-based physical layer transceivers can be used to instead transmit and receive TDM serial bit streams in place of data packets, a function not conventionally contemplated for such transceivers.

Thus, according to the present invention, multiple digital audio-related signals can be transported over conventional communication media (e.g., inexpensive CAT5 or fiber optic cable, or wireless links) without using a packet-based store-and-forward scheme, as implemented in conventional network-based techniques for transporting digital audio.

Rather, in contrast to packet-based network techniques, the concepts according to the present invention discussed herein significantly reduce the complexity of the architecture and circuitry needed to accomplish the task of transporting multiple digital audio signals.

Furthermore, implementations according to various embodiments of the present invention also virtually eliminate almost all of the latency inherent in a conventional store-and-forward packet-based architecture. For example, a typical latency for transporting multiplexed digital signals according to the present invention conservatively is on the order of 10 microseconds, whereas conventional store-and-forward architectures potentially could have significantly longer latencies (e.g., on the order of hundreds of microseconds or ones of milliseconds).

With respect to the types and number of audio-related signals that may be processed by a given terminal unit (e.g., the terminal unit 22 of FIG. 2), it should be readily appreciated that the number of signals that may be multiplexed onto a given TDM bit stream depends in part on the bit stream rates of the respective signals to be multiplexed and the bit stream rate of the TDM stream. The bit stream rate of a given digital audio-related signal in turn may depend (particularly in cases where the digital signal includes sampled audio) on the data or sampling rate used to create the signal and the particular protocol used to encode the signal for transmission.

Various types of conventional digital audio signals have typical data (sample) rates of either 44.1 kHz, 48 kHz, or 96 kHz (other data rates are possible). In particular, a sample rate of 44.1 kHz typically is used for CD (compact disk) audio, a sample rate of 48 kHz typically is used for DAT (digital audio tape) and older professional audio equipment, and a sample rate of 96 kHz is used for current state of the art professional audio applications. Other data rates such as 32 kHz, 88.1 kHz and 192 kHz have been used or considered, but are less common.

A number of different signal protocols conventionally are used in the audio industry to encode sampled signals as serial bit streams. One common protocol discussed in detail further below is the IEC 958 standard. Considering this protocol for the moment for purposes of illustration, exemplary bit stream rates for the more common digital audio signal data (sample) rates indicated above are 2.8224 Mbs for 44.1 kHz, 3.072 Mbs for 48 kHz, and 6.144 Mbs for 96 kHz. While other protocols may result in different bit stream rates for the corresponding sample rates, the foregoing example provides an illustrative range of digital audio signal bit stream rates that may be input to or output from the connectors 28A of the terminal unit 22 shown in FIG. 2. It should be appreciated however that the invention is not limited in this respect, as other bit rates are possible for the input and/or output digital audio-related signals processed by a given terminal unit.

Based on the respective bit stream rates of the signals to be processed, the number of digital audio-related signals that theoretically may be multiplexed onto a given TDM serial bit stream may be determined by the rate of the TDM serial bit stream(s) propagated by the terminal units. For example, as discussed above, for terminal units that employ 100 Mbs transceivers (i.e., transmitting and receiving 100 Mbs TDM serial bit streams), a theoretical maximum of 32 digital audio signals having a bit stream rate of 3.072 Mbs (e.g., an IEC 958 signal having a data rate of 48 kHz) may be multiplexed onto the 100 Mbs TDM bit stream (i.e., 100 Mbs/3.072 Mbs≈32). Similarly, a theoretical maximum of 16 digital audio signals having a bit stream rate of 6.144 Mbs (e.g., an IEC 958 signal having a data rate of 96 kHz) may be multiplexed onto a 100 Mbs TDM bit stream (i.e., 100 Mbs/6.144 Mbs≈16).

According to one embodiment of the invention, digital audio-related signals having different data rates (i.e., different bit stream rates) may be multiplexed on the same TDM bit stream by assigning different numbers of TDM time slot channels to a given digital audio signal "channel" based on its data rate, as discussed further below. Additionally, it should be appreciated that the above examples assume that the digital audio signals occupy essentially the entire bandwidth of the TDM bit stream; however, the invention is not necessarily limited in this respect. For example, according to one embodiment discussed further below, other information (e.g., data rate, data type, control information, etc.) may be included in the TDM bit stream, in addition to the multiplexed digital audio signals, in which case the TDM bit stream would be able to accommodate fewer multiplexed digital audio signals than indicated in the theoretical examples above.

In one embodiment of the invention, a given terminal unit (e.g., as shown in FIG. 2) is configured such that the input and/or output digital audio-related signals processed by the terminal unit do not require the entire available bandwidth of the TDM bit streams. This configuration permits multiple terminal units to share different portions of the available bandwidth, and provides for a digital audio snake apparatus that facilitates a wide variety of deployment configurations and significantly flexible signal routing capabilities.

For example, in one embodiment of the invention discussed further below in connection with FIG. 5, each TDM bit stream is transported from terminal unit to terminal unit at 100 Mbs and is organized as repeating subframes of 16 time slot channels, wherein one time slot channel of a subframe accommodates one digital audio-related signal having a bit stream rate of either 2.8224 Mbs or 3.072 Mbs (e.g., an IEC 958 signal having a sampling rate of either 44.1 kHz or 48 kHz, respectively). Accordingly, TDM bit streams of this embodiment can accommodate 16 different digital audio signals based on the foregoing example.

Figure 4:
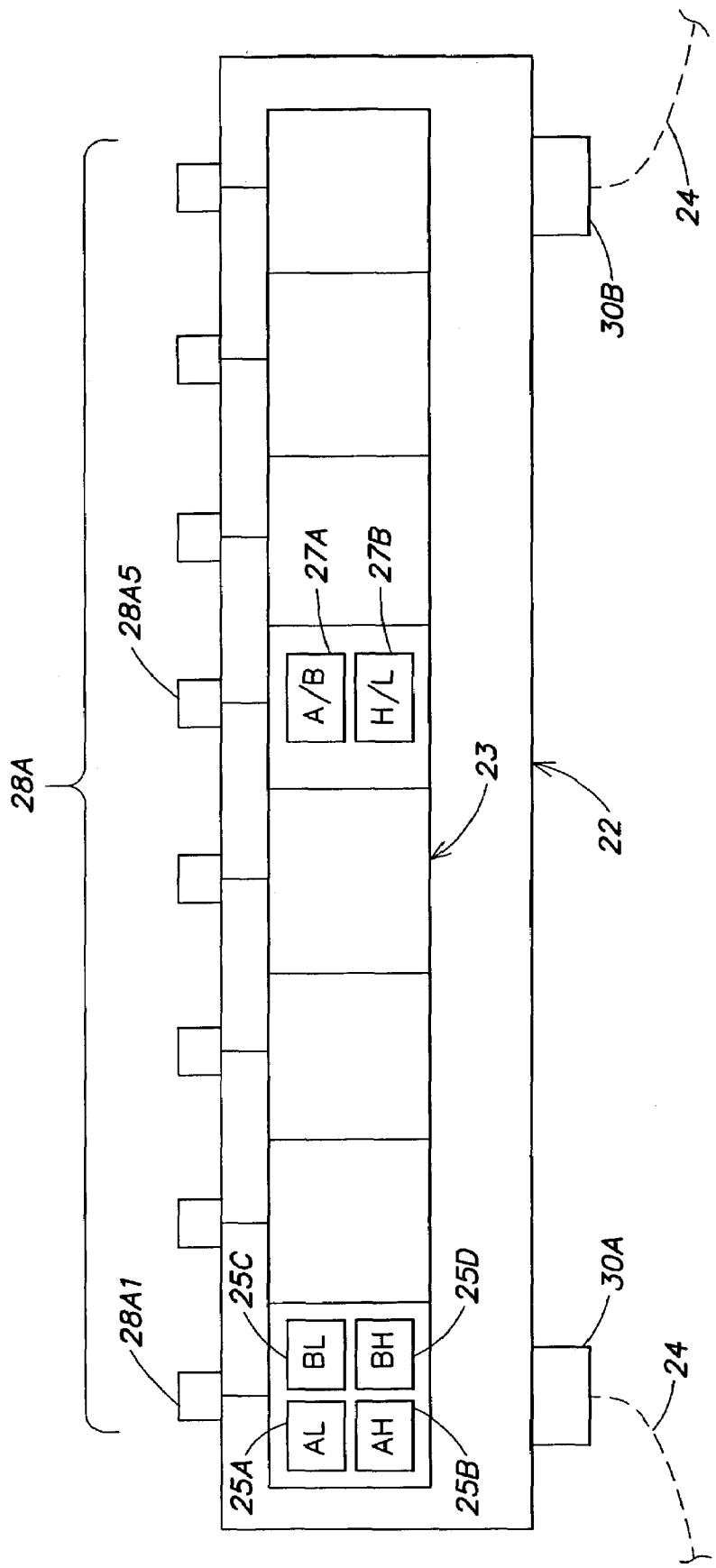
FIG. 4 is a diagram of a terminal unit similar to that shown in FIG. 2, showing one example of a signal selector according to one embodiment of the invention.

In one aspect of this embodiment, referring now to FIG. 4, a terminal unit 22 substantially similar to that shown in FIG. 2 is configured to accommodate eight input and/or output digital audio signals, indicated generally in FIG. 4 with the reference character 28A. In another aspect of this embodiment, the 16 time slot channels of the TDM bit streams are divided into two groups of 8 time slot channels each, which for purposes of this discussion are hereafter referred to as a "low" channel group and a "high" channel group.

In the embodiment of FIG. 4, the signal selector 23 of the terminal unit 22 includes four switches for each input signal; for example, as illustrated in FIG. 4, the input 28A1 is associated with the four switches 25A, 25B, 25C and 25D (each of the other inputs similarly may be associated with a respective group of four switches). These four switches determine how the input signal is multiplexed onto one or more of the TDM bit streams processed by the terminal unit 22.

In particular, as shown in FIG. 4, the switch 25A is also labeled as "AL," indicating that when this switch is activated, the corresponding input signal is multiplexed on the TDM bit stream generated from the port 30A in an assigned time slot channel of the "low" channel group (hence the label "AL," i.e., port A, Low channel group). Similarly, the label "AH" for the switch 25B indicates that when this switch is activated, the corresponding input signal is multiplexed on the TDM bit stream generated from the port 30A in an assigned time slot channel of the "high" channel group. Likewise, activation of the switches 25C and 25D, respectively labeled "BL" and "BH," cause the corresponding input signal to be multiplexed on the TDM bit stream generated from the port 30B, in assigned time slot channels of the "low" channel group and the "high" channel group, respectively.

It should be appreciated that the foregoing implementation for the signal selector 23, and the arrangement of components shown in FIG. 4, is primarily for purposes of illustrating various concepts related to the present invention, and that the invention is not limited to this exemplary implementation. In particular, the various connectors 28A, 30A and 30B, as well as various components of the signal selector 23, may be arranged in a variety of physical configurations in different realizations of the terminal unit 22. For example, in one realization, the terminal unit 22 may be configured as a rack mount enclosure (e.g., a conventional 19" wide rack mount enclosure) with components of the signal selector 23 (e.g., the switches 25A-25D and similar switches for each input signal) located on a front panel easily accessible to a user, while the connectors 28A, 30A and 30B are located on a back panel.

As mentioned above, the terminal unit 22 also or alternatively may be configured to process one or more TDM bit streams received on the ports 30A and or 30B so as to provide one or more digital audio-related output signals from the connectors 28A. FIG. 4 shows such an output 28A5 associated with two switches 27A (A/B) and 27B (H/L). In such an implementation, the switches 27A and 27B of the signal selector 23 may have selection functions similar to those discussed above; however, whereas the input signal 28A1 could be routed to one or both of the TDM streams transmitted from ports 30A and 30B, the output signal 28A5 may be recovered from only one of the TDM streams received on the ports 30A and 30B. Accordingly, the state of the switch 27A determines from which received TDM stream (port A or port B) the output signal is recovered, and the state of the switch 27B determines from which channel group (high or low).

More generally, it should be appreciated that a variety of audio-related input and output signal configurations of different types and numbers (including analog inputs and outputs), as well as a variety of different implementations for the signal selector 23 and a number of different protocols for the TDM serial bit stream, are possible according to various embodiments of the invention. The variety of options available for these aspects of the present invention provide for a wide range of possible terminal unit configurations.

For example, in yet another embodiment of the invention, the terminal units of a digital audio snake may be configured to transmit and receive TDM bit streams as a sequence of essentially continuously repeating frames, in which each frame includes 32 time slot channels. As discussed above, in one aspect of this embodiment in which the multiplexed digital audio-related signals occupy essentially the entire available bandwidth of the TDM bit streams, a TDM bit stream at 100 Mbs can thus accommodate 32 digital audio signals having a bit stream rates of either 2.8224 Mbs or 3.072 Mbs (e.g., an IEC 958 signal having a sampling rate of either 44.1 kHz or 48 kHz, respectively), or 16 digital audio signals having a bit stream rate of 6.144 Mbs (e.g., an IEC 958 signal having a data rate of 96 kHz) (i.e., one digital audio signal per two time slot channels of the 32 slot TDM frame).

In one aspect of this embodiment, the 32 time slot channels of each TDM bit stream may be organized in groups of channels (e.g., eight groups of four channels, four groups of eight channels, etc.), and each terminal unit of the digital audio snake may be particularly configured to transmit and/or receive signals on a particular group of channels even though entire TDM bit streams are transmitted and received by the terminal unit.

Figure 4A:
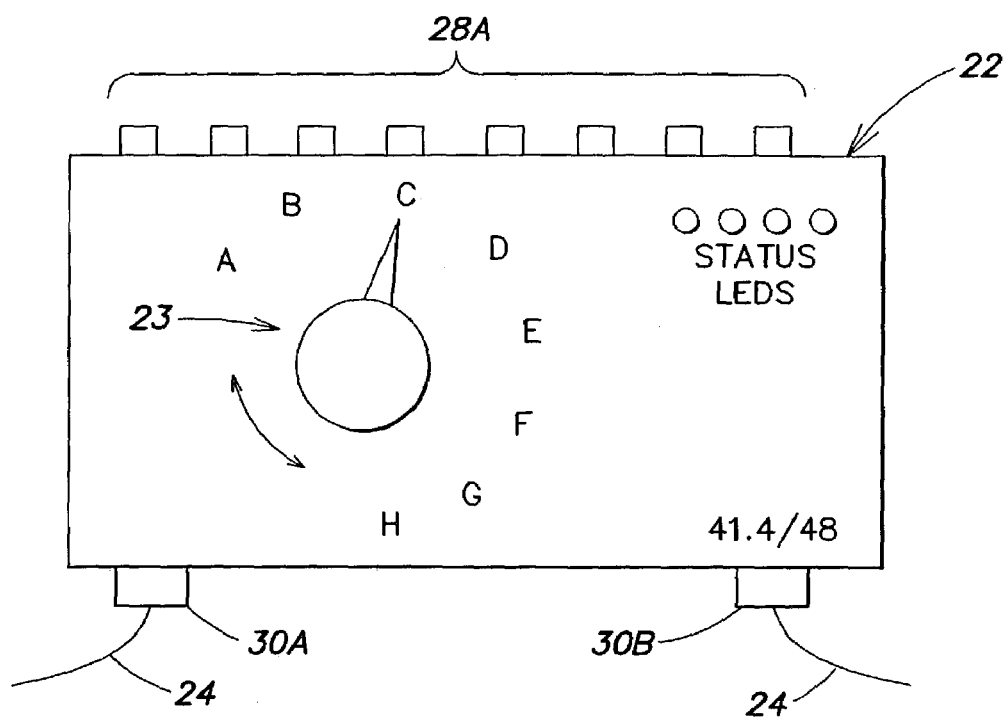
FIGS. 4A and 4B are diagrams showing alternative implementations of terminal units employing a rotary type signal selector, according to other embodiments of the invention.

For example, in one embodiment of the invention, the TDM bit stream 32-slot frame is organized into eight groups of four TDM time slot channels, and the controller of a given terminal unit is configured to accommodate four IEC 958 44.1 kHz or 48 kHz digital audio input signals (i.e., eight audio input channels) and four IEC 958 44.1 kHz or 48 kHz digital audio output signals (i.e., eight audio output channels). Additionally, in one aspect of this embodiment, as shown in FIG. 4A, each terminal unit may include a rotary switch for the signal selector 23, monitored by the controller of the terminal unit, to indicate which one of the eight groups of four TDM channels are used to transport the four digital audio input signals and four digital audio output signals coupled to the controller of the terminal unit. For example, as shown in FIG. 4A, the eight groups of four channels may be designated as A, B, C, D, E, F, G, H, respectively, and a user would select one of the channel groups A-H via the signal selector 23 to designate which channel group would be used to transport the digital audio signals coupled to the terminal unit. In this manner, respective terminal unit pairs of the digital audio snake apparatus shown in FIG. 1 may be set to different channel groups, to facilitate a wide variety of possible audio signal distribution arrangements.

Figure 4B:
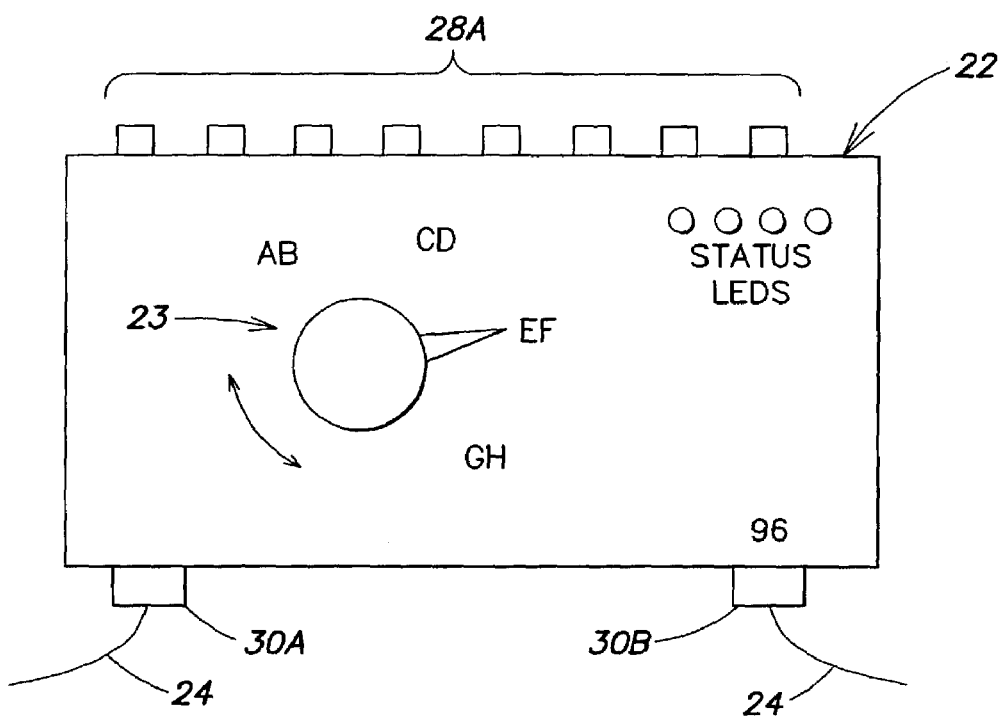

In the foregoing example, it should be appreciated that different numbers of channels may be arranged in a channel grouping scheme, and digital audio signals having different data rates may be used. For example, in another implementation, the 32-slot data frame of the TDM serial bit stream is divided into four groups of eight TDM time slot channels, and a given terminal unit controller is configured to accommodate four IEC 958 digital audio input signals and four IEC 958 digital audio output signals having a data rate of 96 kHz. Each bit of a 96 kHz digital audio signal occupies two TDM time slot channels; hence four 96 kHz digital audio signals occupy eight TDM channels, and each terminal unit may be configured to operate on one of the four groups of eight TDM channels in a manner similar to that described above. For example, as shown in FIG. 4B, the four groups of eight TDM channels may be designated as AB, CD, EF, and GH, respectively, and a user would select one of the these channel groups via the signal selector 23 to designate which channel group would be used to transport the digital audio signals coupled to the terminal unit.

In sum, in the embodiment of the digital audio snake 20 shown in FIG. 1, it should be appreciated that multiple terminal units may be arranged in a variety of configurations and placed in various locations as needed to flexibly, reliably and efficiently pick up and deliver audio-related signals from one place to another. As discussed above, each terminal unit may be separated from the next terminal unit by as much as 100 meters, a distance far exceeding the practical length over which conventional analog audio cable can be employed, all the while retaining the advantages that noise-free digital audio transmission provides.

Following below is a more detailed explanation of some of the functions of the controller 32 of the terminal unit 22 shown for example in FIG. 2, according to one embodiment of the invention. For purposes of the following discussion, an example using IEC 958 digital audio signals is considered for processing by the controller 32. However, as discussed above, it should be appreciated that the invention is not limited to processing IEC 958 digital audio signals; in particular, several of the concepts discussed below may be applied more generally to process other types of digital audio signals, as should be readily appreciated by one of skill in the art. 3. Transporting IEC 958 Digital Audio Signals By way of background, an IEC 958 digital audio signal is defined by industry standard protocol as a bi-phase mark code (BMC) serial digital signal (i.e., including high or "1" and low or "0" logic states) having a zero voltage mean. Details of the IEC 958 protocol may be found in the publication "The AES3 and IEC60958 Digital Interface, "Technote No. 26, authored by Julian Dunn and published in 2001 by Audio Precision, 5750 SW Arctic Drive, Beaverton, Oreg. 97005, which publication is hereby incorporated herein by reference. The AES3 standards also are discussed in detail in the documents "AES recommended practice for digital audio engineering—serial transmission format for two-channel linearly represented digital audio data," publication AES3-1992 (r1997), Audio Engineering Society, Inc. (copyright 1992-2000), and "AES Information document for digital audio engineering—Transmission of AES3 formatted data by unbalanced coaxial cable," publication AES-3id-2001, Audio Engineering Society, Inc. (copyright 2001), which documents also are hereby incorporated herein by reference.

An IEC 958 signal is transmitted as 64-bit frames, wherein each bit has a time slot that begins with a transition and ends with a transition, and comprises two "unit intervals." If the data bit is a logic "1," an additional transition is made in the middle of the time slot, i.e., at the end of the first unit interval. On the other hand, if the data bit is a logic "0," there is no additional transition during the time slot.

In IEC 958 digital audio signals, each 64-bit frame is in turn divided into two 32-bit subframes, one subframe for left channel audio information and one subframe for right channel audio information. In essence, a given subframe represents one digitized "sample" of an original analog audio signal. In the IEC 958 protocol, the first four time slots of each 32-bit subframe is dedicated to a preamble, the next twenty-four bits are dedicated to the sampled audio data, and the last four bits of a frame supply various control and status information for the protocol.

According to the IEC 958 protocol, each four-time-slot preamble of a subframe includes an intentional BMC violation; namely, every preamble of a subframe includes one or two instances of a logic state (either "1" or "0") having a duration of three unit intervals, rather than the standard time slot length of two unit intervals. The IEC 958 protocol defines three different preamble types, an "X" preamble used to identify the first subframe of a 64-bit frame (an "X subframe"), a "Y" preamble used to identify the second subframe of a 64-bit frame (a "Y subframe"), and a "Z" preamble which periodically replaces an "X" subframe and is used to identify the beginning of consecutive blocks of audio data. Again, in all instances, the preambles in IEC 958 digital audio signals are four time slots long (i.e., eight unit intervals), leaving 24 bits in a given subframe of actual audio data per sample of an original analog audio signal, and four other control/status bits for the protocol.

As discussed above, according to conventional audio industry standards, IEC 958 digital audio signals may have typical data (sample) rates of either 44.1 kHz, 48 kHz, or 96 kHz (although other data rates are possible). Based on the protocol discussed above, these sample rates correspond to serial bit stream rates of the IEC 958 digital audio signals of 2.8224 Mbs for 44.1 kHz, 3.072 Mbs for 48 kHz, and 6.144 Mbs for 96 kHz.

Figure 5:
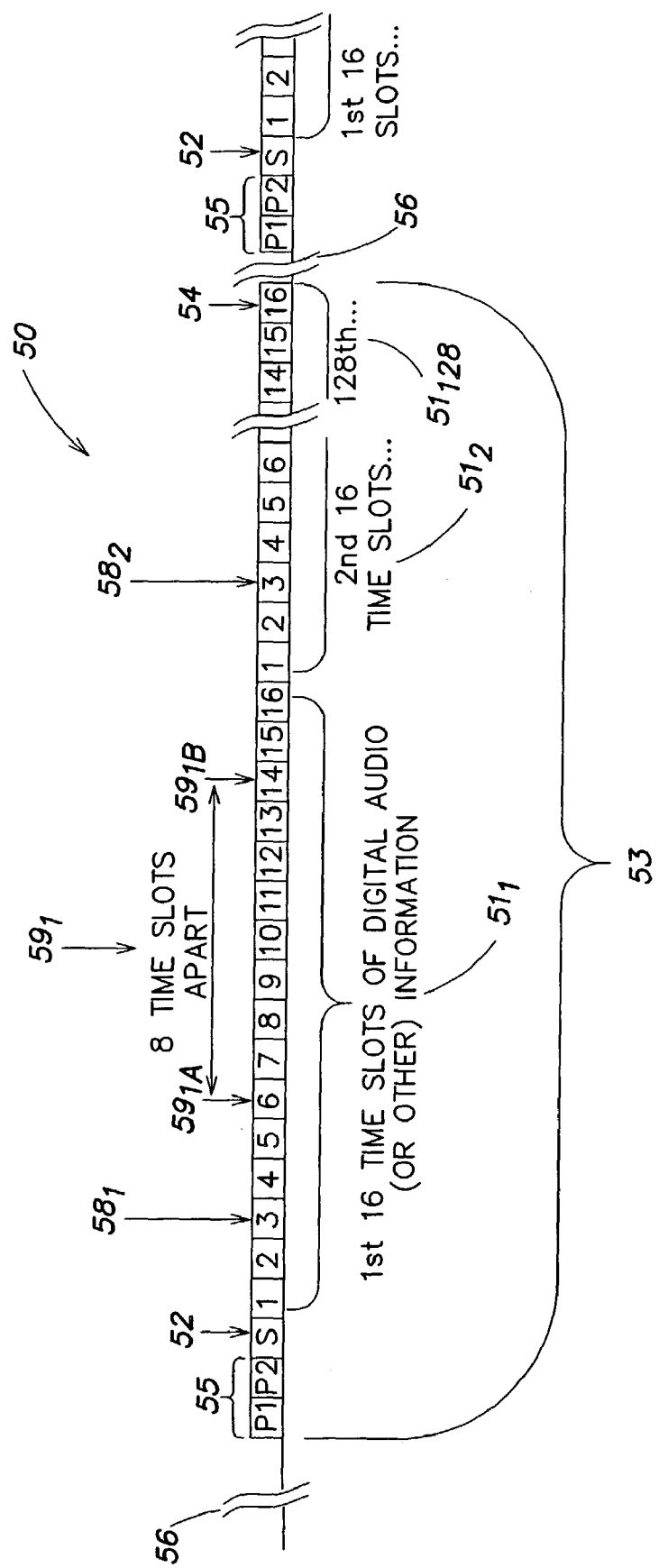
FIG. 5 is a diagram showing an exemplary format for a TDM bit stream used in the digital audio snake of FIG. 1, according to one embodiment of the invention.

FIG. 5 illustrates a TDM bit stream format 50, according to one embodiment of the invention, that is configured to transport multiplexed IEC 958 digital audio signals having the same or different data rates (i.e., bit stream rates). The format illustrated in FIG. 5 also is capable of accommodating a number of audio signal types other than IEC 958 signals; these are discussed further below in other embodiments. For the moment, the TDM bit stream format illustrated in FIG. 5, as well as a protocol according to one embodiment of the invention for encoding digital audio-related signals for multiplexing onto a TDM bit stream, are explained using the specific example of IEC 958 audio signals.

In the TDM bit stream format 50 of FIG. 5, a TDM frame 53 according to one embodiment of the invention is organized as 128 consecutive subframes $51_1$ through $51_{128}$ each including 16 time slot channels. Each time slot channel of a subframe includes four data bits. Each TDM frame 53 begins with two preamble slots 55 (i.e., eight bits total) followed by a start of frame slot 52 (i.e. four bits). The last time slot channel $51_{128}$ of the $128^{th}$ subframe serves as an end of frame slot 54. Accordingly, a single frame 53 includes 2051 time slot channels (i.e., two preamble slots, one start of frame slot and 16×128 subframe time slot channels). Between consecutive frames 53, the format includes a twenty-four slot (i.e., 96 bits) interframe gap 56. Thus, the total number of time slot channels between similarly positioned time slot channels of consecutive frames is 2075 (i.e., 2051 time slot channels/frame+twenty-four slots providing an interframe gap).

In embodiments of the invention in which a given terminal unit is configured to transmit and/or receive one or more TDM bit streams at 100 Mbs, each bit therefore is 10 nanoseconds long. Hence, each time slot channel of the format shown in FIG. 5 is forty nanoseconds long, and the total time between similarly positioned time slot channels of consecutive frames therefore is 83 microseconds (i.e., 2075 time slot channels×four bits/time slot×10 nanoseconds/bit). In the format shown in FIG. 5, for this time period, it should be appreciated that 128 instances of a given time slot channel of encoded audio-related signal data is transmitted. For example, as shown in FIG. 5, a given audio-related signal may be assigned the third time slot channel of each subframe, as indicated by the reference characters $58_1$ and $58_2$. In each instance of the third time slot channel of a subframe, a portion of a corresponding encoded audio-related signal is placed. In every frame, there are 128 instances of this third time slot channel. This results in an "effective time-slot rate" for each time slot channel carrying audio-related data of approximately 1.5422 Mega-slots per second (i.e., 128 time slots/83 microseconds).

With reference again for the moment to FIGS. 2 and 3, it should be appreciated that the controller 32 of a given terminal unit 22 may be particularly configured according to one embodiment of the invention to control one or more transceivers 36A and 36B so as to generate (or pass through) one or more TDM bit streams having the format 50 illustrated in FIG. 5. In one aspect of this embodiment in which a given transceiver 36 is a conventional Ethernet transceiver such as the LXT972A shown in FIG. 3, the controller 32 may be configured to sequentially transmit to and receive from the interface (e.g., MII) of a given transceiver 36 the data in each four bit time slot channel of the TDM format (i.e., a four bit "nibble") via the connections TXD<3:0> and RXD<3:0>, respectively. In yet another aspect of this embodiment, the twenty-four slot interframe gaps 56 in the TDM format 50 shown in FIG. 5 (i.e., 24 time slots×4 bits/slot×10 nanoseconds/bit=960 nanosecond gaps) are provided to allow the transceiver(s) to perform various synchronization and scrambling/descrambling functions per manufacturer's specifications. In particular, during the interframe gaps 56, the TX_EN and RX_DV signals are deasserted to trigger these functions.

Table 1 below gives a protocol, according to one embodiment of the invention, which the controller 32 of a given terminal unit 22 implements to encode and decode IEC 958 digital audio signals to and from respective time slot channels of the TDM format 50 shown in FIG. 5.

TABLE 1

| | | | |
|---|---|---|---|
| 0000 = data "00" | 0100 = X preamble @44.1 KHz | 1000 = X preamble @48 KHz | 1100 = X preamble @96 KHz |
| 0001 = data "01" | 0101 = pad (no data available) | 1001 = other data type | 1101 = Start of TDM frame |
| 0010 = data "10" | 0110 = Y preamble @44.1 KHz | 1010 = Y preamble @48 KHz | 1110 = Y preamble @96 KHz |
| 0011 = data "11" | 0111 = Z preamble @44.1 KHz | 1011 = Z preamble @48 KHz | 1111 = Z preamble @96 KHz |

In the protocol illustrated in Table 1, each consecutive time slot of a given time slot channel assigned to an IEC 958 signal may include information pertaining to actual data from the signal (i.e., the first column of Table 1), the preamble type (i.e., X, Y, or Z, as discussed above), and the data sampling rate of the signal (i.e., 44.1 kHz, 48 kHz or 96 kHz). The protocol of Table 1 also includes provisions for the start of frame slot 52 of the TDM format 50 ("0101"), as well as a "pad slot" ("0101") and an indication of "other data type" ("1001"). These latter two codes are discussed in greater detail below. Although Table 1 does not explicitly indicate the contents of the preamble slots 55 (P1 and P2) shown in the format of FIG. 5, in one embodiment each of these slots contains "0101" (i.e., the pad code).

It is noteworthy that, according to one embodiment of the invention, the protocol of Table 1 implements an "in-band" signaling/encoding technique by using a portion of the bandwidth of a given TDM channel assigned to a given digital audio signal to transmit various encoded information relating to the digital audio signal (e.g., preamble type, data rate). This concept of in-band signaling constitutes one aspect of the present invention for facilitating accurate and reliable recovery of multiplexed digital audio signals that are transmitted and received in respectively different clock domains. In particular, it should be appreciated that the essentially continuously propagating TDM serial bit streams of the present invention are significantly different than signal transmission according to conventional Ethernet protocol.

According to one aspect of the present invention, differences in oscillators on either end of a given communication link, no matter how minute, must be accounted for in the design of an indefinitely long data stream that travels from one clock domain to the next. In particular, in one aspect of the invention, the resolution and accuracy of data recovery needs to be accurate enough to satisfy the digital audio jitter requirements of 0.25 unit intervals peak to peak, according to the IEC 958 digital audio standard, while providing an interrupted stream of digital audio as an output signal. The in-band signaling technique exemplified by the protocol of Table 1 facilitates such data recovery; as discussed below in connection with FIG. 6B, the IEC 958 signals are oversampled and essentially transported "as is" over the TDM bit stream, along with the data rate and preamble type encoded in the TDM bit stream, but with essentially no decoding of the IEC 958 protocol itself (beyond the IEC 958 preamble).

It is also noteworthy in the protocol of Table 1 that a four bit time slot of a given time slot channel carries two data bits of an encoded audio signal, as illustrated by the first column of Table 1. This means that at a TDM bit stream rate of 100 Mbs, a given time slot channel of the format 50 shown in FIG. 5, based on the protocol of Table 1, has an effective bit rate of 3.0844 Mbs (i.e., 1.5422 Mega-slots per second×2 data bits/time slot). This in turn implies that one time slot channel of each subframe is capable of accommodating one IEC 958 signal having a sample rate of either 44.1 kHz (i.e., 2.8224 Mbs) or 48 kHz (i.e., 3.072 Mbs). However, two time slot channels of each subframe are required to accommodate one IEC 958 signal having a sample rate of 96 kHz (i.e., 6.144 Mbs); namely, the effective bit rate for two time slot channels per subframe is 3.0844 Mbs/channel×2 channels/subframe=6.1688 Mbs. The requirement of two time slot channels per subframe for IEC 958 signals having a sample rate of 96 kHz is indicated in FIG. 5 by the time slot channel assignment 591, wherein the assignment actually includes two time slot channels $59_{1A}$ and $59_{1B}$ of each subframe. In one aspect of this embodiment, as indicated in FIG. 5, time slot channel assignments for 96 kHz IEC 958 signals include two time slot channels of a given subframe that are spaced apart by eight time slots.

It is also noteworthy that the effective bit rates indicated above for assigned time slot channels of the TDM bit stream are slightly faster than the actual bit rates of the IEC 958 signals assigned to the channels. Table 2 below summarizes these conditions:

TABLE 2

| | | | |
|---|---|---|---|
| Data rate of signal | 44.1 kHz | 48 kHz | 96 kHz |
| Actual bit rate of signal | 2.8224 Mbs | 3.072 Mbs | 6.144 Mbs |
| Effective bit rate of channel(s) assigned to signal | 3.0844 Mbs | 3.0844 Mbs | 6.1688 Mbs |

In one embodiment of the invention discussed further below, the difference between the actual bit rate of a signal and the effective bit rate of one or more TDM time slot channels assigned to the signal is compensated for, at least in part, by the use of padding information inserted into the assigned channel of the TDM stream. In one aspect of this embodiment, this padding information is provided by the "pad" code ("0101") indicated in the protocol of Table 1. The use of the pad code to provide padding information in time slot channels to at least partially compensate for differences between actual and effective bit rates is discussed further below in connection with FIGS. 6A, 6B, 7A and 7B.

Figure 6A:
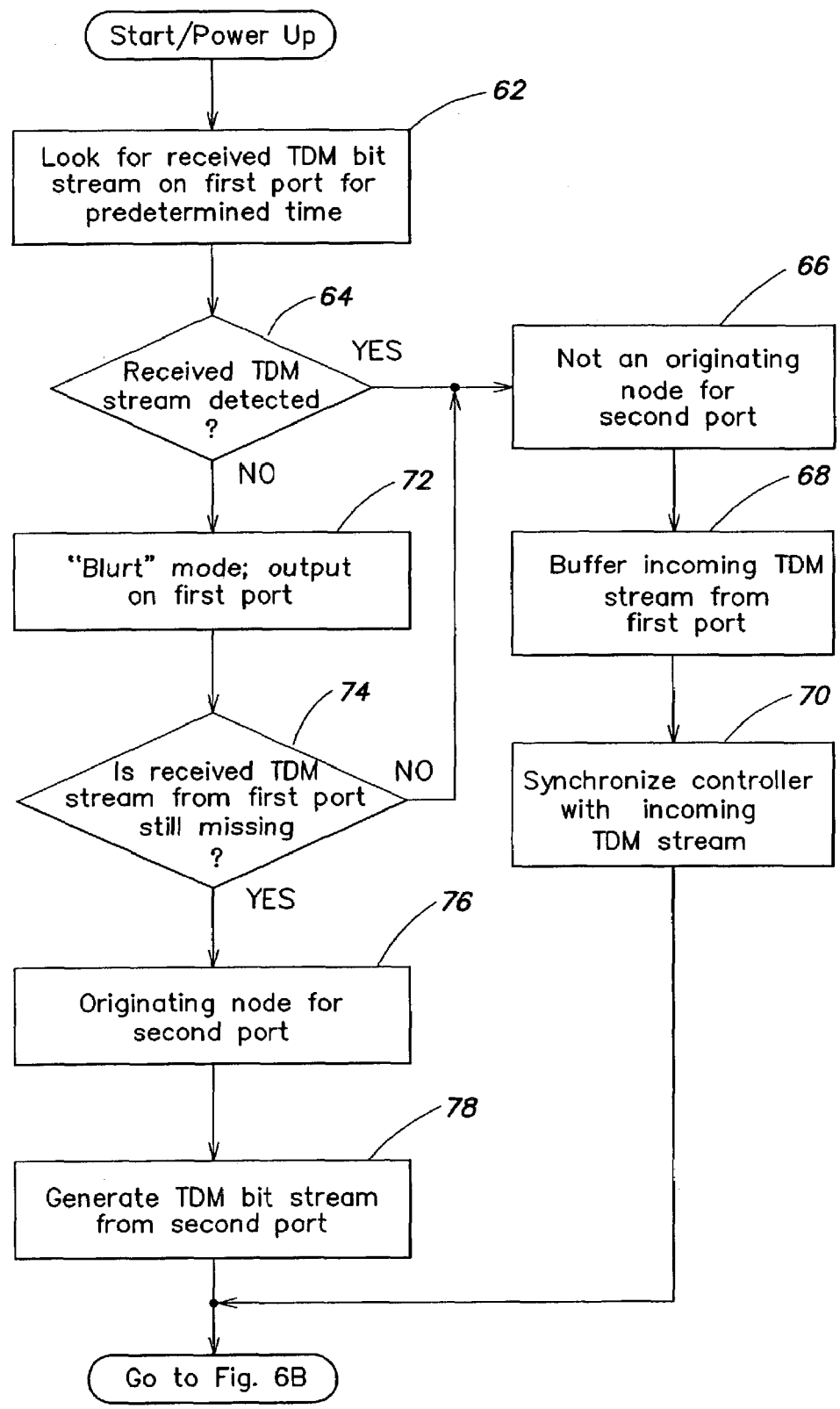
FIGS. 6A and 6B are flow charts showing an exemplary method for multiplexing a digital audio-related signal on the TDM bit stream of FIG. 5, according to one embodiment of the invention.
Figure 6B:
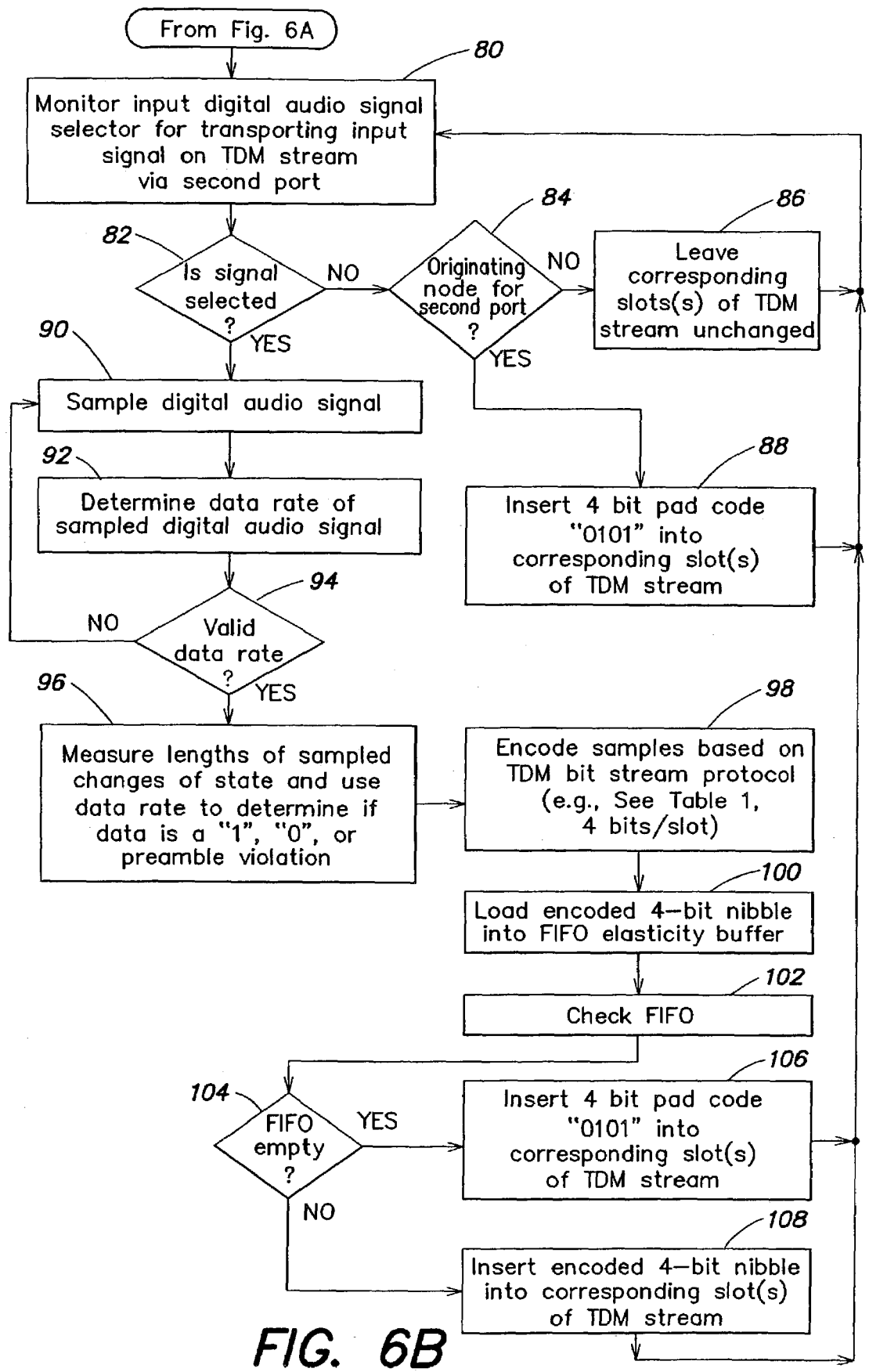
Figure 7A:
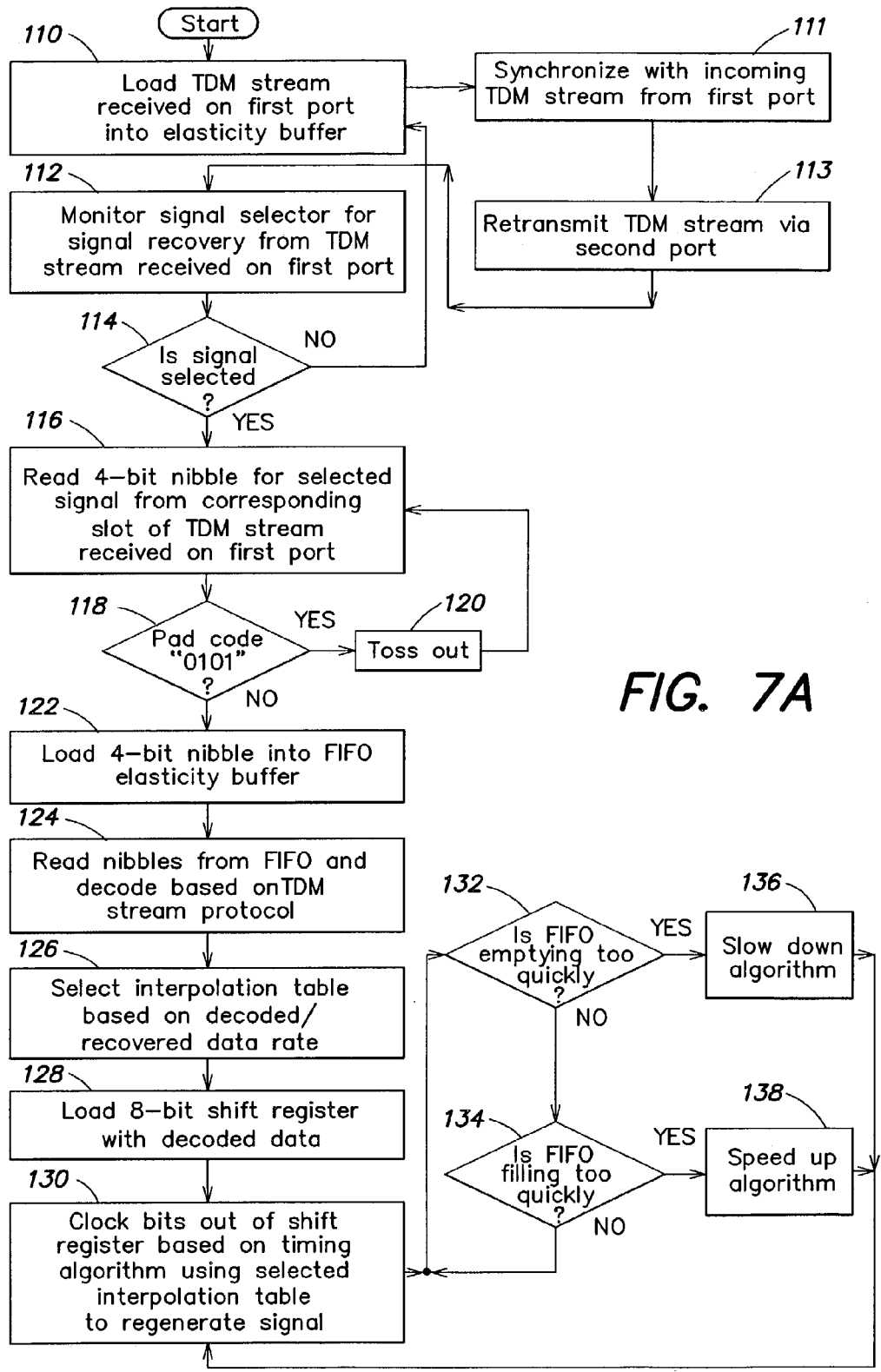
FIGS. 7A and 7B are flow charts showing an exemplary method for recovering a digital audio-related signal that is multiplexed on the TDM bit stream of FIG. 5, and re-generating the recovered signal, according to one embodiment of the invention.
Figure 7B:
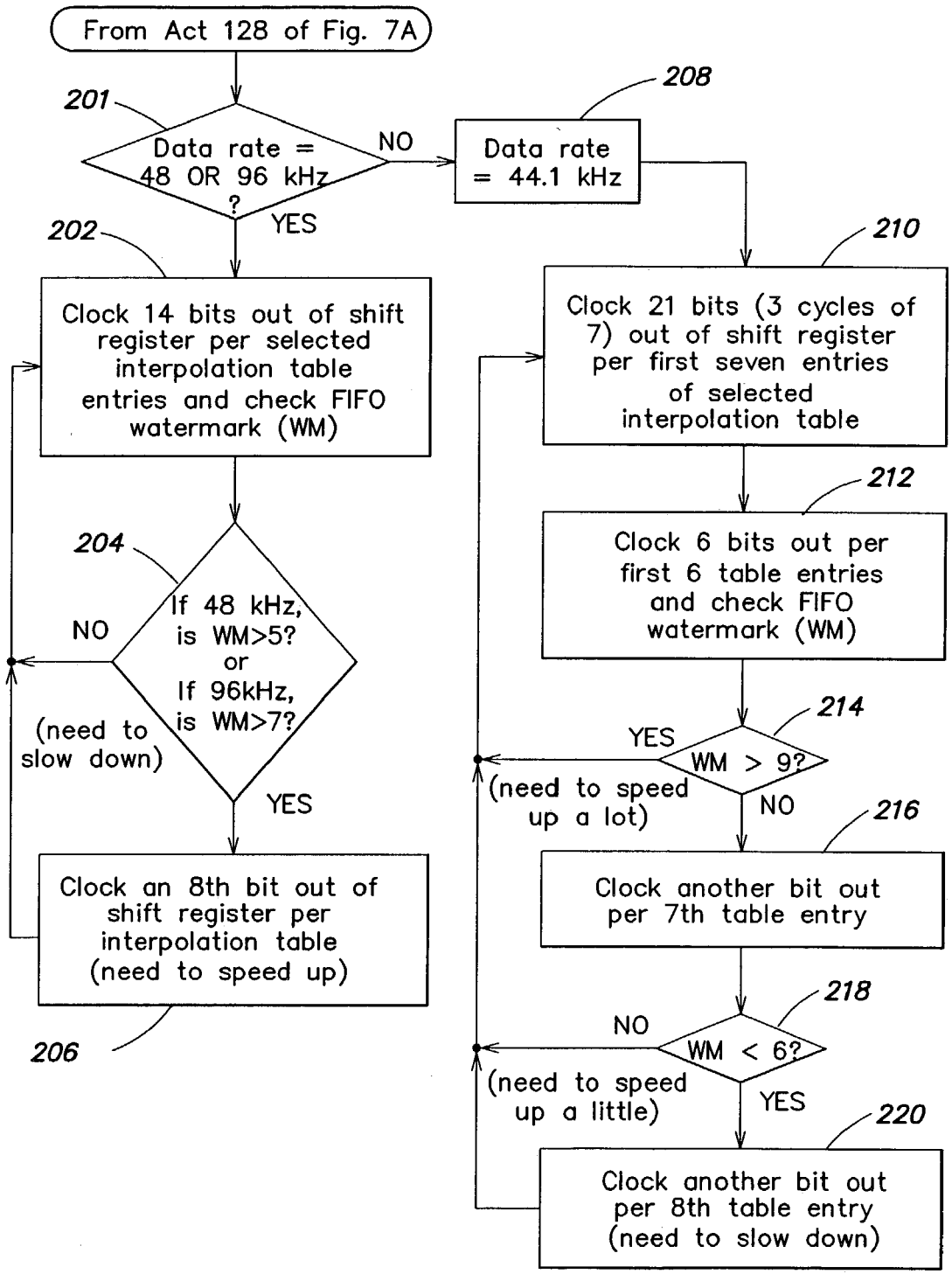

Having established an exemplary format for a TDM bit stream and an exemplary protocol for encoding and decoding IEC 958 digital audio signals that are multiplexed on the TDM bit stream, FIGS. 6A and 6B illustrate a method, according to one embodiment of the invention, for processing an IEC 958 digital audio signal input to a terminal unit similar to that shown in FIG. 2, and encoding and multiplexing the signal on a TDM serial bit stream. FIGS. 7A and 7B illustrate a complimentary method, according to one embodiment of the invention, for receiving at another terminal unit the TDM serial bit stream including the encoded digital audio signal, recovering decoding the encoded digital audio signal from the TDM stream and decoding the recovered information, and re-generating the digital audio signal as an output from the other terminal unit.

Figure 8:
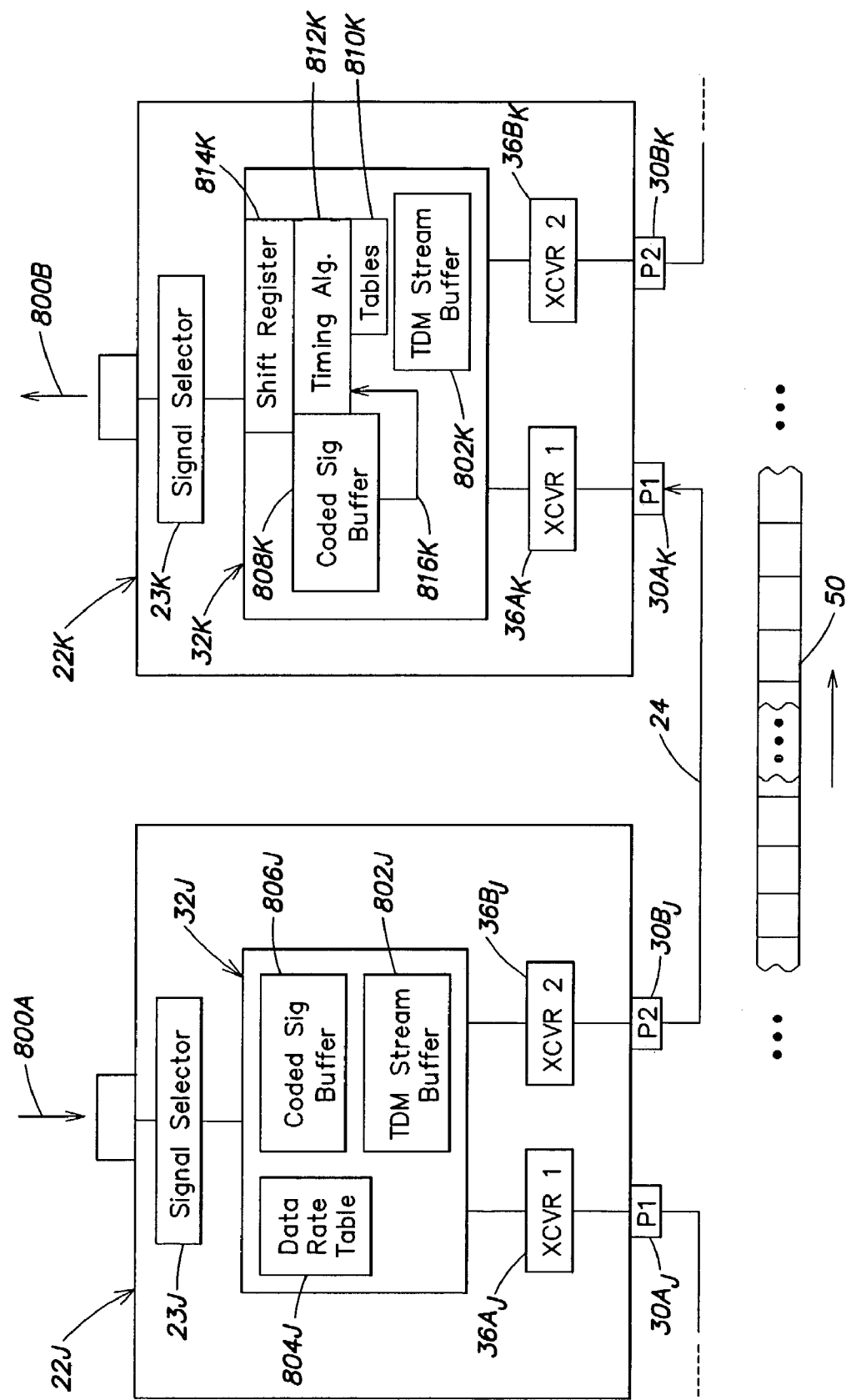
FIG. 8 is a diagram illustrating a pair of terminal units that are configured to implement the methods outlined in FIGS. 6A, 6B, 7A and 7B, according to one embodiment of the invention.

FIG. 8, which is included to facilitate an explanation of the methods in FIGS. 6A, 6B, 7A and 7B, illustrates two terminal units 22J and 22K, each similar to the terminal unit 22 shown in FIG. 2. FIG. 8 shows in greater detail some components of the controllers 32J and 32K of the respective terminal units that implement various acts of the methods illustrated in FIGS. 6A, 6B, 7A and 7B. As indicated in FIG. 8, the terminal unit 22J receives as an input an IEC 958 signal 800A, encodes and multiplexes the signal on a TDM stream having the format 50, and transmits the TDM stream from the port $30B_J$ over communication medium 24 to the terminal unit 22K. The terminal unit 22K receives the TDM stream via the port $30A_K$, recovers the signal from the TDM stream and decodes the recovered information, and outputs the regenerated IEC 958 signal 800B.

Although FIGS. 6A, 6B, 7A and 7B outline various functions in an essentially sequential manner for purposes of illustration, the controllers of the terminal units shown in FIG. 8 do not necessarily implement the indicated acts pursuant to the sequence illustrated in the figures. In particular, according to one embodiment of the invention, the controllers are designed as state machines that perform multiple essentially concurrent processes which have the combined effect of implementing the acts shown in FIGS. 6A, 6B, 7A and 7B.

With reference now to both FIGS. 6A and 8, the method illustrated in FIG. 6A begins in act 62 by ascertaining (e.g., on initial power-up or after a temporary interruption of power) if the terminal unit 22J of FIG. 8 is an "end node" (i.e., if the terminal unit 22J originates a TDM stream from the port $30B_J$, or merely passes on a TDM stream received from another terminal unit via the port $30A_J$). For purposes of the following discussion, the ports $30A_J$ and $30A_K$ shown in FIG. 8 are referred to as the "first" ports of their respective terminal units 22J and 22K, while the ports $30B_J$ and $30B_K$ are referred to as the "second" ports of their respective terminal units. In one aspect of this embodiment, the first ports may be provided by male type connectors, while the second ports may be provided by female type connectors (or vice versa), wherein the first port of a given terminal unit is connected to a complementary second port of an adjacent terminal unit in the daisy chain configuration shown in FIG. 1.

As indicated in act 62 of FIG. 6A, the controller 32J of the terminal unit 22J determines if it is an "end node controller" for purposes of transmitting a TDM stream from its second port $30B_J$ by first looking, for a predetermined time (e.g., a time greater than the 24-slot interframe gap 56, such as 64 slots or 2.56 microseconds), to see if a TDM stream is received on its first port $30A_J$. In one aspect of this embodiment, the controller 32J accomplishes this by monitoring the RX-DV (receive data valid) signal output of the transceiver $36A_J$ (e.g., see FIG. 3) for the predetermined amount of time. In another aspect, the controller may be configured to similarly monitor the CRS (carrier sense) signal of the transceiver $36A_J$.

If in act 64 of FIG. 6A a received TDM stream is detected on the first port of terminal unit 22J, the controller 32J then knows, as indicated in act 66, that it is not an end node controller originating a TDM stream from the terminal unit's second port; rather, the controller 32J processes the incoming TDM stream on the terminal unit's first port for re-transmission on its second port. To this end, as indicated in the act 68, the controller 32J minimally buffers the incoming TDM stream (e.g., two to three time slots), via the TDM stream buffer 802J shown in FIG. 8, to keep the latency from terminal unit to terminal unit relatively low. As shown in act 70 of FIG. 6A, the controller 32J also synchronizes the incoming TDM stream from the terminal unit's first port by looking for the start of frame slot 52 (see FIG. 5; recall that the four bit code for the start of frame slot is given by the protocol in Table 1 above as "1101").

If in the act 64 the controller 32J does not detect an incoming TDM stream on the terminal unit's first port, the controller enters a "blurt" or broadcast mode in act 72, in which it provides an output via its first port to inform another terminal unit coupled to that port that the terminal unit 22J exists. In one aspect of this embodiment, the controller 32J accomplishes this by asserting the TX-EN signal (i.e., transmit enable; see FIG. 3) to the transceiver $36A_J$ for a predetermined amount of time (e.g., 16 slots or 640 nanoseconds). If each terminal unit that may be coupled to the terminal unit 22J similarly is configured to enter a "blurt" mode under these circumstances, a terminal unit coupled to the second port of the terminal unit 22J presumably also provides a blurt or broadcast signal to the terminal unit 22J.

Accordingly, in act 74 of FIG. 6A, the controller 32J continues to monitor the first port $30A_J$ for such a signal; if such a signal is detected, the method again proceeds to act 66, in which the controller has ascertained that it is not an end node controller for purposes of originating a TDM stream from the second port $30B_J$ of the terminal unit 22J (i.e., another transmitting terminal unit is coupled to the first port of terminal unit 22J). However, if no such signal is detected (e.g., there is nothing coupled to the first port), the controller 32J then knows that it is indeed an end node controller for purposes of originating a TDM stream from the terminal unit's second port, as indicated in act 76. The method then proceeds to act 78, wherein the controller 32J controls the transceiver $36B_J$ so as to essentially continuously generate a TDM stream from the second port according to the format 50 shown in FIG. 5 (i.e., including the interframe gaps 56), using the protocol indicated in Table 1.

Turning now to act 80 of FIG. 6B, the controller 32J of FIG. 8 monitors the signal selector 23J (e.g., see FIGS. 2 and 4) to determine if any audio signals input to the terminal unit 22J (e.g., the signal 800A) are selected for multiplexing onto the TDM stream output from the terminal unit's second port. For each audio signal input that may be selected in the terminal unit 22J, the controller 32J pre-assigns one or more particular time slot channels of a TDM subframe according to the format 50 shown in FIG. 5. If in act 82 it is determined that a given signal is not so selected, the controller 32J takes one of two actions, as indicated in act 84; if the controller 32J is an originating or end node for transmitting the TDM stream from the second port, it controls the transceiver $36B_J$ so as to insert the four bit pad code "0101" (i.e., no data available) into the corresponding slots of the pre-assigned time slot channel(s) of the TDM stream, as indicated in act 88. If, however, the controller 32J is not an originating or end node and rather passes on a TDM stream received on its first port, the controller does nothing; namely, as indicated in the act 86, the corresponding pre-assigned slot(s) for the input signal is/are left unchanged.

If in the act 82 the input audio signal 800A indeed is selected to be multiplexed onto the TDM stream transmitted from the second port, the method proceeds to the act 90, wherein the controller 32J samples the selected audio signal 800A. In one embodiment, the controller 32J is configured to sample the input signal 800A at a rate sufficient to resolve the BMC logic states of the IEC 958 signal. For example, if the transceiver $36B_J$ is a 100 Mbs Ethernet transceiver as shown in FIG. 3, the physical interface (e.g., MII) port between the controller 32J and the transceiver 36B$_J$ includes four parallel data lines (e.g., TXD<3:0> and RXD<3:0>, also referred to as "nibbles") that are clocked at 25 MHz so as to correspond to the 100 Mbs data rate of the transceiver (i.e., 4 bits×25 MHz=100 Mbs). Accordingly, the controller 32J may significantly "oversample" the selected IEC 958 digital audio signal 800A (e.g., having a bit rate on the order of either 3 or 6 Mbs) at 25 MHz or faster (e.g., 50 MHz), without any decoding of the IEC 958 protocol itself. A selected IEC 958 digital audio signal therefore may be transferred essentially bit by bit, with the exception of the preamble, as discussed further below.

As indicated in act 92 of FIG. 6B, the controller 32J samples the selected IEC 958 signal to first determine the data (sample) rate of the signal (e.g., 44.1 kHz, 48 kHz or 96 kHz). In particular, according to one embodiment, since the BMC violative preambles of the IEC 958 digital audio signal represent the slowest transition time (i.e., the longest continuous logic state) in the signal, the controller 32J first determines the length of the preambles of the signal 800A (e.g., based on detecting the longest continuous logic state present in the signal) to in turn determine the data rate of the signal. Table 3 below lists the more common data rates for a IEC 958 digital audio signal, the corresponding bit rate of the signal, the corresponding length of a three unit interval BMC violation in a preamble of the signal (average value, i.e., not including allowances for jitter), the approximate number of consecutive samples needed to detect the BMC violation at a controller sampling rate of 25 MHz (40 nanoseconds/sample), and the approximate number of consecutive samples needed to detect the BMC violation at a controller sampling rate of 50 MHz (20 nanoseconds/sample).

TABLE 3

| Signal Data Rate | Signal Bit Rate | Length of BMC violation | No. of samples at 25 MHz (40 ns/sample) | No. of samples at 50 MHz (20 ns/sample) |
| --- | --- | --- | --- | --- |
| 44.1 kHz | 2.8224 Mbs | 531.463 ns | 13-14 | 26-27 |
| 48 kHz | 3.072 Mbs | 488.28 ns | 11-13 | 23-25 |
| 96 kHz | 6.144 Mbs | 244.14 ns | 5-7 | 11-13 |

The data in Table 3 shows that while a sampling rate of 25 MHz is not sufficient to resolve the difference between a 44.1 kHz signal and a 48 kHz signal (13-14 samples versus 11-13 samples, respectively), a sampling rate of 50 MHz provides greater resolution to differentiate between these two data rates (26-27 samples versus 23-25 samples, respectively), especially when allowances for signal jitter are considered. According to one embodiment of the invention, as shown in FIG. 8, the controller 32J stores a data rate table 804J similar to that shown in Table 3 above (taking into consideration the actual sampling rate implemented by the controller). It should be appreciated that the sampling rates of 25 MHz and 50 MHz are provided primarily for purposes of illustration, as other (e.g., faster) sampling rates are possible according to other embodiments.

In the act 90 of FIG. 6B, the controller 32J may sample the selected input signal 800A multiple times to reliably identify a preamble (e.g., the controller may continue sampling until it identifies, for example, 2-10 consecutive BMC violations having the same duration to insure that it has repeatedly and accurately detected a number of preambles).

In one aspect of this embodiment, the controller is configured to take enough samples of successive preambles so as to accommodate input jitter within the specification prescribed by the IEC 958 protocol (e.g., 0.25 unit intervals). For example, in one aspect, the controller looks for two consecutive three unit-interval violations (as found in an X preamble) to effectively resolve jitter and sampling time inaccuracies.

Once the controller reliably detects one or more preamble components and measures their corresponding lengths, it then accesses the data rate table 804J to determine the corresponding data rate of the sampled signal. If there is no entry in the data rate table 804J corresponding to the measured BMC violation, it is assumed that the determined data rate is invalid, as indicated in act 94 of FIG. 6B. As a result, the controller 32J continues to sample the selected signal, as discussed above. If a valid table entry is found, however, the method proceeds to the act 96, wherein the controller 32J measures the lengths of each sampled change of state to determine, based on the previously determined signal data rate, if the sampled change of state constitutes a data "1", a data "0", a preamble "violation", or represents an invalid condition.

Once the controller appropriately samples the selected signal 800A in the act 96, it encodes the sampled signal, in the act 98, based on the protocol of Table 1. As discussed above, the protocol of Table 1 provides for encoding not only the actual data in the sampled signal, but also the data rate and preamble type. In particular, both the data and other information pertaining to the sampled signal are encoded as consecutive four bit "nibbles" that are loaded sequentially, as indicated in act 100, into a coded signal buffer 806J shown in FIG. 8. The controller 32J then transfers these nibbles from the buffer 806J to the transceiver 36B$_J$ and in turn to sequential time slots of the time slot channel(s) of the TDM stream to which the input signal 800A is assigned, as indicated in act 108 of FIG. 6B.

In one aspect of this embodiment, the buffer 806J is a FIFO elasticity buffer that provides at least partial compensation for the difference between the actual bit stream rate of the input signal 800A and the effective bit stream rate of the time slot channel(s) of the TDM stream that is/are assigned to the input signal. In one implementation, the FIFO elasticity buffer has sixteen elements (i.e., is capable of storing sixteen four-bit nibbles), although the invention is not limited in this respect, as other buffer sizes are possible. As discussed above in connection with Table 2, for a number of possible data rates of the selected input signal 800A (e.g., 44.1 kHz, 48 kHz, 96 kHz) the effective bit stream rate of the assigned time slot channel(s) of the TDM stream is greater than the actual bit stream rate of the signal. As a result, in essence, the sampled and encoded nibbles of the input signal cannot be provided quickly enough to the FIFO elasticity buffer 806J; specifically, consecutive time slots of the assigned time slot channel(s) of the TDM stream are "ready for loading" by the controller 32J at a rate that is slightly faster than the four bit nibbles of the encoded signal are provided to the FIFO elasticity buffer 806J.

Accordingly, as indicated in act 102 of FIG. 6B, the controller 32J checks the FIFO elasticity buffer 806J when it is time to load a time slot of the assigned time slot channel(s). In the act 104, if the buffer is not empty, the controller merely transfers the next available four bit nibble from the buffer to the time slot (via the transceiver 36B$_J$), as indicated in the 108. However, if the buffer is empty, the controller instead inserts the four bit pad code "0101" (see Table 1) into the time slot, as indicated in act 106. By inserting such padding information from time to time, the controller is essentially compensating for the greater effective bit rate of the assigned time slot channel(s). As discussed further below in connection with FIG. 7A, this padding information merely is discarded when the TDM stream is received and decoded by the terminal unit 22K.

Having encoded and multiplexed the input signal 800A on the TDM stream, FIGS. 7A and 7B describe a method, according to one embodiment of the invention, for receiving the TDM stream at the terminal unit 22K shown in FIG. 8, recovering the encoded signal, and re-generating the signal as an output signal 800B.

In act 110 of FIG. 7A, the TDM stream received on the first port $30A_K$ of the terminal unit 22K is loaded into the TDM stream elasticity buffer 802K, which functions similarly to the buffer 802J of the terminal unit 22J. In act 111, the controller 22K synchronizes with the incoming TDM stream by looking for the start of frame slot, in a manner similar to that discussed above in connection with the act 70 of FIG. 6A. In act 113, the controller 22K retransmits the TDM stream via the terminal unit's second port $30B_K$. In one aspect of this embodiment, the controller 32K is configured to perform the act 113 by default, i.e., whether or not there is another terminal unit coupled to the terminal unit 22K via its second port $30B_K$.

In act 112 of FIG. 7A, the controller 32K monitors the signal selector 23K (e.g., see FIGS. 2 and 4) to determine if any audio signals are selected to be recovered from one or more pre-assigned time slot channels of the TDM stream received on the terminal unit's first port $30A_K$, and output as one or more regenerated audio signals from the terminal unit 22K. If in act 114 a particular audio signal output is not selected, the controller 32K merely continues to buffer the incoming TDM stream received on the first port $30A_K$. For purposes of the present discussion, it is assumed that the signal selector 23K is activated to select recovery and regeneration of the signal 800B for output from the terminal unit 22K.

For the selected signal, the method of FIG. 7A proceeds to act 116, in which the encoded four bit nibbles for the selected signal are read sequentially from the time slots of the corresponding assigned time slot channel(s) of the TDM stream received on the first port $30A_K$. As indicated in acts 118 and 120, as the controller 32K encounters pad codes "0101," it merely tosses these nibbles out (i.e., these nibbles are ignored), as discussed above in connection with FIG. 6B.

If, however, the four bit nibble read from the TDM stream is not a pad code, it is loaded in the act 122 into the coded signal buffer 808K shown in FIG. 8. In one aspect of this embodiment, the coded signal buffer 808K is a FIFO elasticity buffer that provides at least partial compensation for the difference between the "target" bit stream rate of the output signal 800B (i.e., the actual bit stream rate of the original signal 800A) and the effective bit stream rate of the time slot channel(s) of the TDM stream that is/are assigned to the transported audio signal. In one implementation, the FIFO elasticity buffer 808K has 16 elements, similar to the buffer 806J of the terminal unit 22J, although other buffer sizes are possible according to other implementations. In act 124 of FIG. 7A, the controller 32K sequentially reads the nibbles from the FIFO elasticity buffer 808K and decodes the nibbles based on the protocol given in Table 1, so as to recover both the data and other information that was encoded in the assigned time slot channel(s) (i.e., the data rate and preamble types that are used to regenerate the IEC 958 output signal 800B).

According to another aspect of this embodiment, the controller 32K regenerates the output signal 800B by loading a shift register 814K (shown in FIG. 8) with the actual bits of the IEC 958 signal to be regenerated based on the decoded information recovered from the TDM stream. In one implementation, the shift register 814K is an eight bit register. The controller then sequentially clocks these bits out of the shift register at an appropriate rate so as to regenerate the signal 800B. In clocking out the bits from the shift register 814K, the controller 32K implements a timing algorithm 812K, which in turn consults one of a number of interpolation tables, shown generally in FIG. 8 as the tables 810K. The information stored in the interpolation tables 810K establishes the consecutive intervals at which each bit is sequentially clocked out of the shift register 814K by the timing algorithm 812K.

In yet another aspect of this embodiment, the controller 32K adjusts the execution of the timing algorithm 812K (and hence the rate at which bits are clocked out of the shift register) based on a watermark 816K of the FIFO elasticity buffer 808K (i.e., an indication as to how full the buffer is). In essence, the FIFO elasticity buffer 808K, the timing algorithm 812K responsive to the watermark 816K, and the interpolation tables 810K enable the controller 32K to at least partially compensate for the difference between the target bit stream rate of the regenerated output signal 800B and the effective bit stream rate of the time slot channel(s) of the TDM stream from which the output signal is recovered.

More specifically, as indicated in act 126 of FIG. 7A, the controller 32K stores a corresponding interpolation table for each possible data rate of the signal 800B to be regenerated (e.g., 44.1 kHz, 48 kHz, and 96 kHz), and selects a particular interpolation table for use by the timing algorithm 812K based on the data rate recovered and decoded from the assigned time slot channel(s) of the TDM stream. Each interpolation table includes a number of entries indicating consecutive time intervals at which bits are to be sequentially clocked out of the shift register 814K so that the resulting bit rate of the regenerated signal 800B corresponds to the decoded data rate. Further details of the interpolation tables are discussed below in connection with FIG. 7B.

Once the controller 32K selects the appropriate interpolation table in the act 126 based on the decoded data rate, in act 128 the controller loads the shift register 814K with bits corresponding to the appropriately decoded preambles, data, and other information making up the output signal 800B. In act 130, the controller 32K implements the timing algorithm 812K to clock bits out of the shift register 814K using the selected interpolation table so as to regenerate the signal 800B at the appropriate rate.

As mentioned above, in clocking bits out of the shift register, the controller may vary the timing algorithm 812K based on the watermark 816 K of the FIFO elasticity buffer 808K. In particular, the watermark 816K provides the controller 32K with an indication of how quickly the buffer 808K is filling (i.e., as nibbles are being read from the TDM stream via the transceiver $36A_K$ and passed to the buffer 808K) and emptying (i.e., as nibbles are read from the buffer 808K, decoded, and loaded into the shift register 814K). More specifically, as indicated in acts 132, 134, 136, and 138 of FIG. 7A, if the watermark 816K indicates to the controller that the buffer 808K is emptying too quickly, the controller 32K adjusts the timing algorithm 812K so as to slow down the clocking out of bits from the shift register 814K ("slow down algorithm"), which in turn causes the buffer 808K to fill more quickly. If, on the other hand, the watermark 816K indicates to the controller that the buffer 808K is filling too quickly, the controller adjusts the timing algorithm 812K so as to clock out bits more quickly from the shift register 814K ("speed up algorithm"), which in turn causes the buffer 208L to empty more quickly.

FIG. 7B illustrates the details of the timing algorithm 812K according to one embodiment of the invention. The method acts illustrated in FIG. 7B show in greater detail essentially the acts 130, 132, 134, 136, and 138 shown in FIG. 7A (i.e., the acts illustrated in FIG. 7B follow conceptually from the act 128 of FIG. 7A), and particularly illustrate the use of the interpolations tables 810K.

Table 4 below illustrates the contents of three different interpolation tables (indicated collectively in FIG. 8 as the tables 810K), according to one embodiment of the invention, that are stored in the controller 32K and used by the timing algorithm 812K to clock bits out of the shift register 814K. Beginning from the leftmost column, the second, third, and fourth columns of Table 4 represent the contents of a different interpolation table for each of the three possible data rates at which the output signal 800B may be regenerated (44.1 kHz, 48 kHz, or 96 kHz).

TABLE 4

| Interpolation Table Entry No. | IEC 958 44.1 kHz Values (nanoseconds) | IEC 958 48 kHz Values (nanoseconds) | IEC 958 96 kHz Values (nanoseconds) |
|---|---|---|---|
| 1 | 180 | 160 | 80 |
| 2 | 170 | 170 | 80 |
| 3 | 180 | 160 | 80 |
| 4 | 180 | 160 | 90 |
| 5 | 180 | 160 | 80 |
| 6 | 170 | 170 | 80 |
| 7 | 180 | 160 | 80 |
| 8 | 180 | 160 | 80 |

In particular, each of the second, third and fourth columns in Table 4 includes eight table entries, wherein each table entry gives a value in nanoseconds representing an interval between consecutive bits clocked out of the shift register 814K. For example, considering for the moment the 44.1 kHz interpolation table values indicated in the second column of Table 4, the timing algorithm 812K using these table entries clocks a first bit out of the shift register 814K, and then 180 nanoseconds later clocks out a second bit (table entry no. 1), 170 nanoseconds later clocks out a third bit (table entry no. 2), 180 nanoseconds later clock out a fourth bit (table entry no. 3), and so on, sequentially using the remaining values of the table entries to clock out subsequent bits from the shift register.

It should be appreciated that every two bits clocked out of the shift register 23K constitute one bit of the IEC 958 output signal 800B, pursuant to the protocol for these signals; recall that each bit of an IEC 958 signal begins with a transition and ends with a transition, and comprises two "unit intervals." In the IEC 948 protocol, if the data bit of the signal is a logic "1", an additional transition is made between the two unit intervals. Accordingly, an IEC 958 logic "1" is represented by two consecutive bits having different logic states clocked out of the shift register 814K, whereas an IEC 958 logic "0" is represented by two consecutive bits having the same logic state clocked out of the shift register. In view of the foregoing, two consecutive table entries of the interpolation tables shown in Table 4 (corresponding to two consecutive bits clocked out of the shift register) are used to generate one bit of the regenerated IEC 958 signal 800B.

Tables 5A, 5B, and 5C below provide an interpolation analysis of the timing algorithm 812K based on the table entries shown in FIG. 4. In particular, Table 5A shows a timing algorithm interpolation analysis based on a 44.1 kHz IEC 958 signal having a bit stream rate of 2.8224 Mbs, Table 5B shows a similar analysis for a 48 kHz IEC 958 signal having a bit stream rate of 3.072 Mbs, and Table 5C shows a similar analysis for a 96 kHz IEC 958 signal having a bit stream rate of 6.144 Mbs.

TABLE 5A

IEC 958 44.1 kHz Timing Algorithm Interpolation Analysis

| Interpolation Table Entry No. | Entry Value (nanoseconds) | Cumulative Bit Time (nanoseconds) | "Ideal" Cumulative Bit Time based on bit rate of 2.8224 Mbs (nanoseconds) | Δ (ppm) |
|---|---|---|---|---|
| 1 | 180 | 180 | 177.154195 | |
| 2 | 170 | 350 | 354.30839 | |
| 3 | 180 | 530 | 531.462585 | |
| 4 | 180 | 710 | 708.61678 | |
| 5 | 180 | 890 | 885.770975 | |
| 6 | 170 | 1060 | 1062.92517 | 2752 ppm fast |
| 7 | 180 | 1240 | 1240.079365 | 64 ppm fast |
| 8 | 180 | 1420 | 1417.23356 | 1952 ppm slow |

TABLE 5B

IEC 958 48 kHz Timing Algorithm Interpolation Analysis

| Interpolation Table Entry No. | Entry Value (nanoseconds) | Cumulative Bit Time (nanoseconds) | "Ideal" Cumulative Bit Time based on bit rate of 3.072 Mbs (nanoseconds) | Δ (ppm) |
|---|---|---|---|---|
| 1 | 160 | 160 | 162.7604167 | |
| 2 | 170 | 330 | 325.5208333 | |
| 3 | 160 | 490 | 488.28125 | |
| 4 | 160 | 650 | 651.0416667 | |
| 5 | 160 | 810 | 813.8020833 | |
| 6 | 170 | 980 | 976.5625 | |
| 7 | 160 | 1140 | 1139.322917 | 594 ppm slow |
| 8 | 160 | 1300 | 1302.08333 | 1600 ppm fast |

TABLE 5C

IEC 958 96 kHz Timing Algorithm Interpolation Analysis

| Interpolation Table Entry No. | Entry Value (nanoseconds) | Cumulative Bit Time (nanoseconds) | "Ideal" Cumulative Bit Time based on bit rate of 6.144 Mbs (nanoseconds) | Δ (ppm) |
|---|---|---|---|---|
| 1 | 80 | 80 | 81.38020833 | |
| 2 | 80 | 160 | 162.7604167 | |
| 3 | 80 | 240 | 244.140625 | |
| 4 | 90 | 330 | 325.5208333 | |
| 5 | 80 | 410 | 406.9010417 | |
| 6 | 80 | 490 | 488.28125 | |
| 7 | 80 | 570 | 569.6614583 | 594 ppm slow |
| 8 | 80 | 650 | 651.0416667 | 1600 ppm fast |

The second column of each of Tables 5A, 5B, and 5C shows again the respective values of the interpolation table entries for the corresponding data rate, as given above in Table 4. The third column of each of Tables 5A, 5B, and 5C gives the cumulative bit time, based on the values in the second column, of consecutive bits as they are clocked out of the shift register 814K. The fourth column of each of Tables 5A, 5B, and 5C gives an "ideal" cumulative bit time for the IEC 958 signal based on the target bit rate of the signal to be regenerated. Again, it should be appreciated that all of the values given in columns two, three, and four of Tables 5A, 5B, and 5C take into consideration that each bit of the regenerated IEC 958 signal is represented by two consecutive bits clocked out of the shift register 814K.

The rightmost column in each of Tables 5A, 5B, and 5C gives the delta (Δ) between the cumulative bit time of the timing algorithm (column three) and the "ideal" cumulative bit time (column four). This delta essentially represents the accumulated error of the timing algorithm with respect to the target bit rate for the regenerated signal. Values in the delta column of each table are explicitly given only for higher table entries (e.g., 6, 7, 8) and are indicated in parts-per-million. From these values, it can be seen that as the execution of the timing algorithm pursuant to a selected interpolation table causes consecutive bits to be clocked out of the shift register, at any given time the bits are being clocked out either too fast or too slow relative to the "ideal" cumulative bit time. In view of the analysis illustrated in Tables 5A, 5B, and 5C, according to one embodiment of the invention, the controller 32K varies the execution of the timing algorithm 812K such that the average bit rate over time of bits clocked out of the shift register 814K sufficiently approximates the target bit rate of the regenerated signal 800B.

FIG. 7B illustrates the details of this process. If the data rate of the signal to be regenerated is 48 or 96 kHz, as indicated in act 201, the method proceeds to act 202. Using the appropriate interpolation table corresponding to the data rate (i.e., columns three or four of Table 4 above), the controller clocks fourteen bits out of the shift register 814K using the table entries 1-7 (i.e., two cycles of seven bits). In particular, the timing algorithm clocks out seven bits per the first seven table entries, returns to the first table entry, and clocks out an additional seven bits. After clocking out fourteen bits thusly, the controller checks the watermark 816K of the FIFO buffer 808K. Recall that, for purposes of the present discussion, the buffer 808K is configured to hold sixteen entries. The watermark gives the number of entries currently stored in the buffer. As indicated in act 204, if the watermark (WM) is greater than five given a data rate of 48 kHz, or if the watermark is greater than seven given a data rate of 96 kHz, the controller deems that the buffer 808K is filling too quickly and that, accordingly, bits should be clocked out of the shift register 814K at a faster rate.

Referring for the moment again to Tables 5B and 5C above, the delta column of each of these tables indicates that after clocking seven bits out of the shift register using either the 48 kHz or 96 kHz table values, the timing algorithm is running 594 ppm slower than the target bit rate. Accordingly, to "speed up" the algorithm, as indicated in act 206, the controller clocks an eighth bit out of the shift register using the value indicated in the eighth interpolation table entry (e.g., column two of Tables 5B or 5C above). As indicated in the delta column of Tables 5B or 5C, the clocking out of an eighth bit per this entry causes the timing algorithm to be 1600 ppm faster than the target bit rate (i.e., the algorithm is "sped up"). From here, the algorithm returns to the act 202, at which point seven additional bits are clocked out of the shift register per the first seven table entries 1-7, and the watermark 816K is again checked thereafter.

If, however, in the act 204 the indicated watermark conditions are not met, the controller 32K deems that the buffer 808K is emptying too quickly and that the algorithm needs to "slow down." As discussed above, it is again noteworthy that after clocking out seven bits per the first seven table entries, Tables 5B and 54C indicate that the algorithm is running 594 ppm slower than the target bit rate. Accordingly, if the algorithm returns at this point to the first table entry (i.e., the algorithm skips the eighth table entry) and clocks out another seven consecutive bits, the algorithm essentially is "slowed down." This situation is indicated in the act 204, wherein the algorithm returns to the act 202 if the watermark conditions indicated in act 204 are not met.

The general philosophy behind the process indicated in acts 202, 204 and 206 similarly is applied if the data rate of the decoded signal is found to be 44.1 kHz, as indicated in act 208. The process is modified somewhat, however, based in part on the differences in the delta values indicated in the rightmost column of Table 5A as compared to those indicated in Tables 5B and 5C. In particular, when the timing algorithm 812K uses the 44.1 kHz interpolation table values, the controller is configured to vary the algorithm based on two different watermark conditions so as to cause the algorithm to "speed up a lot," "speed up a little" or "slow down." Specifically, turning now to act 210 in FIG. 7B, initially twenty-one consecutive bits (i.e., three cycles of seven bits) are clocked out of the shift register using the first seven entries of the 44.1 kHz interpolation table (see col. 2 of either Table 4 or Table 5A). In particular, the timing algorithm clocks out seven bits per the first seven table entries, returns to the first table entry and clocks out an additional seven bits, and returns again to the first table entry and clocks out seven bits. After these twenty-one bits are clocked out, as indicated in act 212, an additional six bits are clocked out of the shift register per the first six entries of the interpolation table. At this point, the watermark 816K of the FIFO buffer 808K is checked.

If in act 214 the watermark is greater than nine, the controller deems that the buffer 808K is filling too quickly and that the algorithm needs to speed up significantly. Note that as indicated in the rightmost column of Table 5A, the algorithm delta after the sixth table entry is 2,752 ppm fast, such that if the timing algorithm cycles back to the beginning of the interpolation table from this point, it will appreciably "speed up". Accordingly, if the watermark condition in the act 214 is met, the method returns to the act 210 (need to speed up a lot), wherein an additional twenty-one bits are clocked out of the shift register according to three cycles of the first seven table entries; stated differently, the timing algorithm proceeds directly from the sixth table entry back to the first table entry.

If in the act 214 the watermark is not greater than nine, another bit is clocked out of the shift register per the seventh entry of the interpolation table, as indicated in act 216. Note again from Table 5A that after the seventh table entry, the algorithm delta is 64 ppm fast; i.e., if the algorithm returns to the first table entry from this point, it is running slightly on the fast side (but not as fast as if it returned to the first table entry after the sixth table entry). After clocking out this seventh bit, the watermark is again checked, as indicated in act 218. If at this point the watermark is not less than six, the controller deems that the buffer 808K is still filling a bit too quickly, but not as quickly as if the watermark were greater than nine (as evaluated in act 214). Accordingly, the method returns to the act 210 (need to speed up a little bit), and the timing algorithm jumps from the seventh entry of the interpolation table directly back to the first entry.

If in the act 218 the watermark is less than six, the controller deems that the buffer 808K is emptying too quickly and that, as a result, the algorithm should be "slowed down." To this end, another bit is clocked out of the shift register in the act 220 pursuant to the eighth entry of the interpolation table. Note again from Table 5A that upon clocking out eight consecutive bits using all eight of the entries shown in the interpolation table, the algorithm delta is 1,952 ppm slow. Accordingly, returning to the first entry of the interpolation table from this point causes the timing algorithm to "slow down" and thereby allow the buffer 808K to fill more quickly.

It should be appreciated that the interpolation table values indicated in Tables 4, 5A, 5B, and 5C above, as well as the particular size of sixteen elements for the buffer 808K and the watermark threshold conditions indicated in acts 204, 214, and 218, are provided as examples primarily for purposes of illustrating concepts underlying the methods discussed above, and that the invention is not limited to these particular values. In other embodiments, different interpolation table values, buffer sizes, and watermark threshold conditions may be at least in part determined empirically and implemented so as to effectively regenerate the signal 800B at the desired target bit rate.

More generally, variations of the detailed example discussed above in connection with FIGS. 6A, 6B, 7A, 76B and 8 may be implemented so as to accomplish the general functions of effectively compensating for differences between the bit rates of the signals to be multiplexed and regenerated and the effective bit rates of the assigned TDM time slot channels used to transport the multiplexed signals, as well as addressing various synchronization issues that are presented by processing signals in a number of different clock domains, without necessarily requiring a master clock for two or more terminal units or any feedback from one terminal unit to another.

For example, for a given "signal chain" (i.e., the process of inputting the signal 800A to the terminal unit 22J and regenerating the same signal as the signal 800B output by the terminal unit 22K), both the buffer 806J and the buffer 808K (as well as the other buffers discussed above) function in the methods outlined in FIGS. 6A, 6B, 7A, and 7B essentially as clock synchronizers to accommodate a number of clock domains present in the signal chain. In particular, with respect to the input signal 800A itself, this signal represents a clock domain that is virtually ignored due to the configuration of the controller 32J in the terminal unit 22J to sufficiently oversample the signal, as discussed above in connection with act 90 of FIG. 6B. However, an oscillator in the controller 32J which is used to oversample the input signal (e.g., at 25 MHz or 50 MHz) therefore represents a clock domain which needs to be taken into consideration. With reference again for the moment to FIG. 3, an oscillator/reference clock 35 having a frequency of 25 megahertz may be used to both sample an input audio signal and drive a 100 Mbs transceiver of a given terminal unit. Alternatively, a reference clock of 50 MHz may be used to sample an input audio signal and divided by two to then drive one or more 100 Mbs transceivers.

Continuing with reference to FIG. 3, a 100 Mbs transceiver itself conventionally has three clock pins: an input for the reference clock 35, a physical interface port receive clock output RX_CLK, and a physical interface port transmit clock output TX_CLK. In such a transceiver, the transmit clock is isochronous to the reference clock 35, but the timing of its phase with respect to the reference clock is not specified by the manufacturer. The receive clock either isochronously follows the reference clock 35 in the absence of a received TDM bit stream, or it follows an extracted clock from the received TDM stream. In any case, no timing is specified by the manufacturer as being with respect to the reference clock 35. Accordingly, each transceiver in the signal chain (e.g., the transceiver 36B$_J$ and the transceiver 36A$_K$ shown in FIG. 8) presents potentially another two clock domains to consider, in addition to the reference clock. Hence, in some cases, a total of eight clock domains need to be considered for a "signal chain": the transmit and receive clocks of the two transceivers in the signal chain, the controller's reference clock in each terminal unit, and the reference clock for the transceivers in each terminal unit. In view of the foregoing, the elasticity provided by the buffers 806J and 808K, in conjunction with the other acts outlined in FIGS. 6A, 6B, 7A, and 7B, allow the signal 800A to be transported via a TDM stream and accurately regenerated as the signal 800B notwithstanding the different clock domains and signal bit rates present in the signal chain.

In FIG. 8, although certain components in each of the terminal units 22J and 22K have been highlighted to facilitate an explanation of the methods outlined in FIGS. 6A, 6B, 7A and 7B, it should be appreciated that according to one embodiment, each of the terminal units 22J and 22K may be implemented to have all of the "transmit" side and "receive" side components shown in FIG. 8, such that the two terminal units are similarly configured. In such an embodiment, the terminal unit 22K may receive an input audio-related signal that may be encoded and multiplexed on a counter-propagating TDM stream transmitted via its first port 30A$_K$ and received at the second port 30B$_J$ of the terminal unit 22J. The terminal unit 22J then may recover encoded information from the appropriate pre-assigned time slot channel(s) of the received counter-propagating TDM stream, decode the recovered information, and re-generate the audio-related signal originally input to the terminal unit 22K. This process may be illustrated in a relatively straightforward manner using FIGS. 6A, 6B, 7A and 7B by attributing the acts performed by one terminal unit to the other terminal unit, and substituting "first port" for each reference in the figures to a "second port."

With the foregoing in mind, it should also be appreciated that while FIG. 8 merely illustrates one "signal chain" for an input audio-related signal and a corresponding regenerated signal, according to other embodiments each of the terminal units 22J and 22K may concurrently process two or more input and/or output audio-related signals. For each possible "signal chain" provided by the terminal units 22J and 22K, the controllers for the respective terminal units include a coded signal (e.g., FIFO elasticity) buffer similar to the buffer 806J on the "transmit TDM stream" side, and another coded signal (e.g., FIFO elasticity) buffer similar to the buffer 808K on the "receive TDM stream" side. This in turn implies that a given output/input audio-related signal at a given terminal unit may be associated with two elasticity buffers, i.e., one for each transceiver from which a TDM stream may be transmitted or received.

Additionally, although FIGS. 6A, 6B, 7A and 7B outline the acts discussed above in an essentially sequential manner for purposes of illustration, it should be appreciated that the invention is not limited in this respect. Namely, in one embodiment as mentioned earlier, the controllers of the terminal units are designed as state machines that perform multiple essentially concurrent processes which have the combined effect of implementing the acts shown in FIGS. 6A, 6B, 7A and 7B. Such multiple concurrent processes may be executed similarly for each of the multiple audio-related signals that are input to and/or output from the controllers. In other embodiments, the various functions indicated in FIGS. 6A, 6B, 7A and 7B may be implemented in different ways.

Figure 9A:
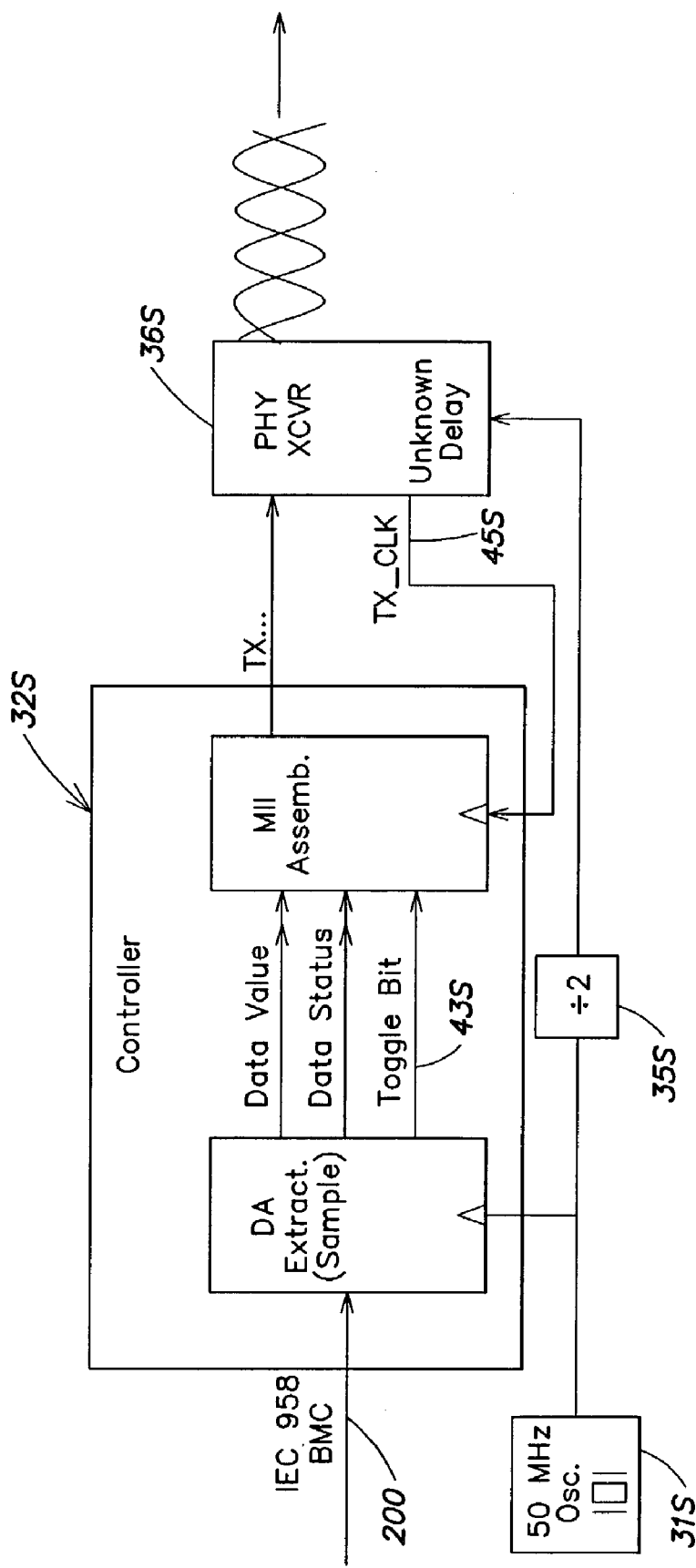
FIG. 9A is a diagram illustrating some components of a terminal unit according to another embodiment of the invention.
Figure 9B:
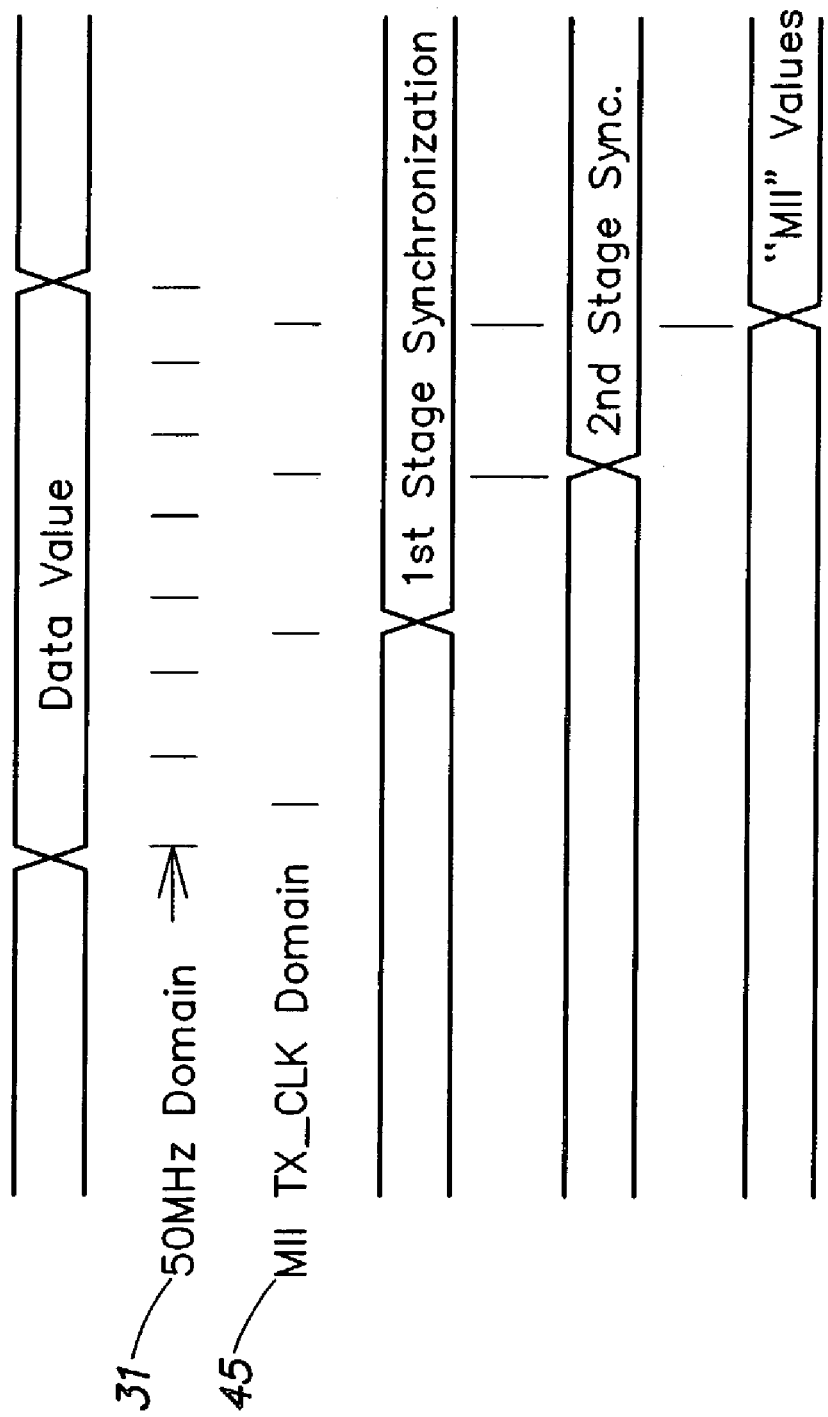
FIG. 9B is a diagram illustrating a synchronization technique implemented in the terminal unit of FIG. 9A.

In yet another embodiment of the invention as shown in FIGS. 9A, 9B, 10A and 10B, the controllers of respective terminal units of a digital audio snake as shown in FIG. 1 are configured to synchronize each terminal unit's clock domains to an adjacent terminal unit's domains, so as to follow the long-term timing of the originating digital audio-related signal, in principle like a phase-locked loop (PLL). For example, as shown in FIG. 9A, at a controller 32S of an end node terminal unit, a 50 MHz reference oscillator 31S drives the controller, which in turn outputs a divided-by-two transceiver reference clock 35S of 25 MHz to the transceiver 36S. Accordingly, as discussed above, the TX_CLK 45 of the transceiver is isochronous to the 25 MHz reference clock 35S with an unknown delay. In this embodiment, the controller in FIG. 9A is configured to provide a toggle bit 43S that changes value with every sampled data bit of an input audio-related signal 200. This toggle bit 43S is synchronized in the controller to the TX_CLK 45S. Because the two different clock domains (i.e., the 50 MHz reference oscillator 31S and the TX_CLK 45S) always could be in a setup/hold region, in one aspect of this embodiment two stages of synchronization are employed in the controller (e.g., two metastability resolving registers), as shown in FIG. 9B.

Figure 10A:
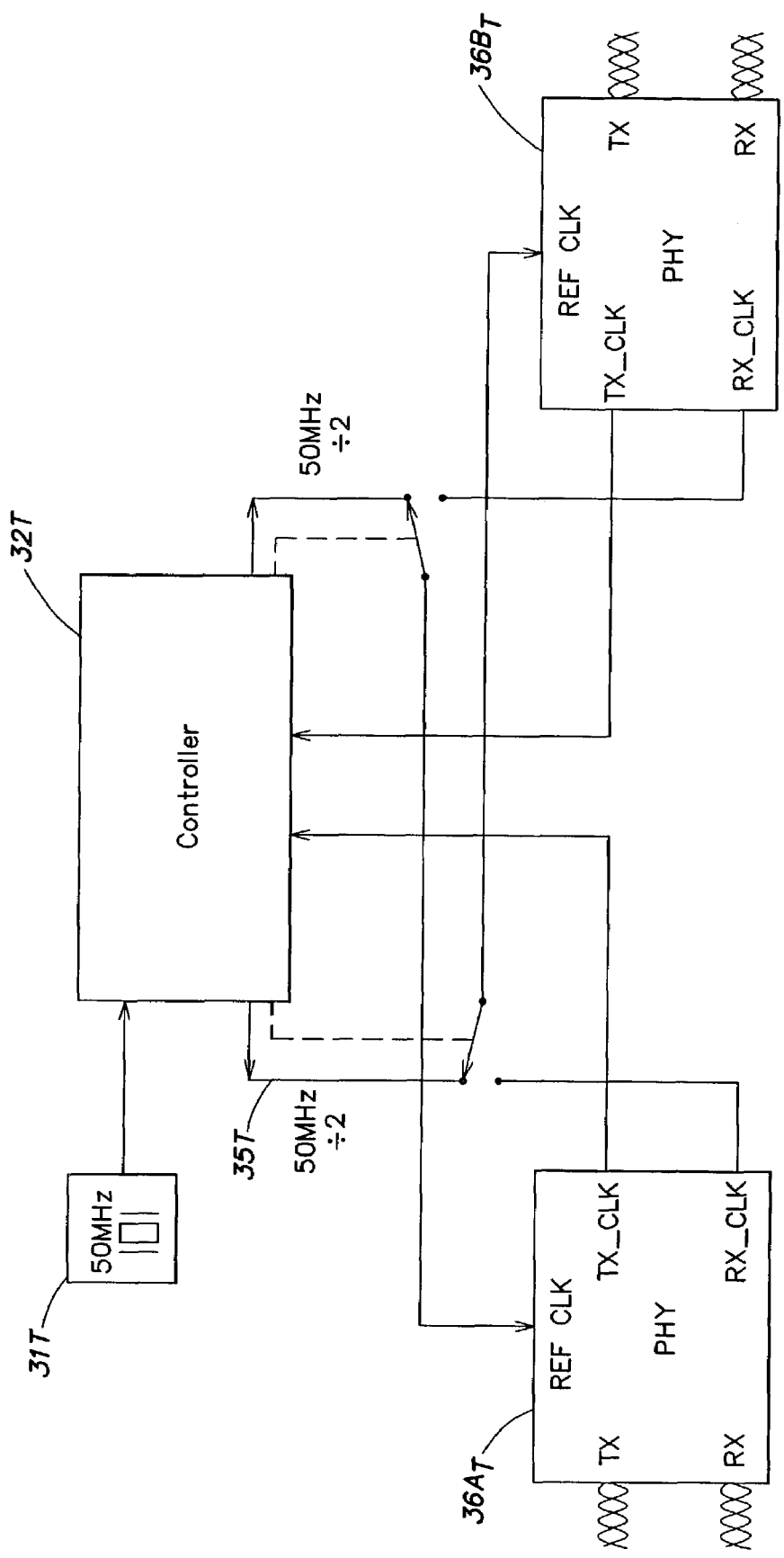
FIG. 10A is a diagram illustrating some components of a terminal unit according to yet another embodiment of the invention.
Figure 10B:
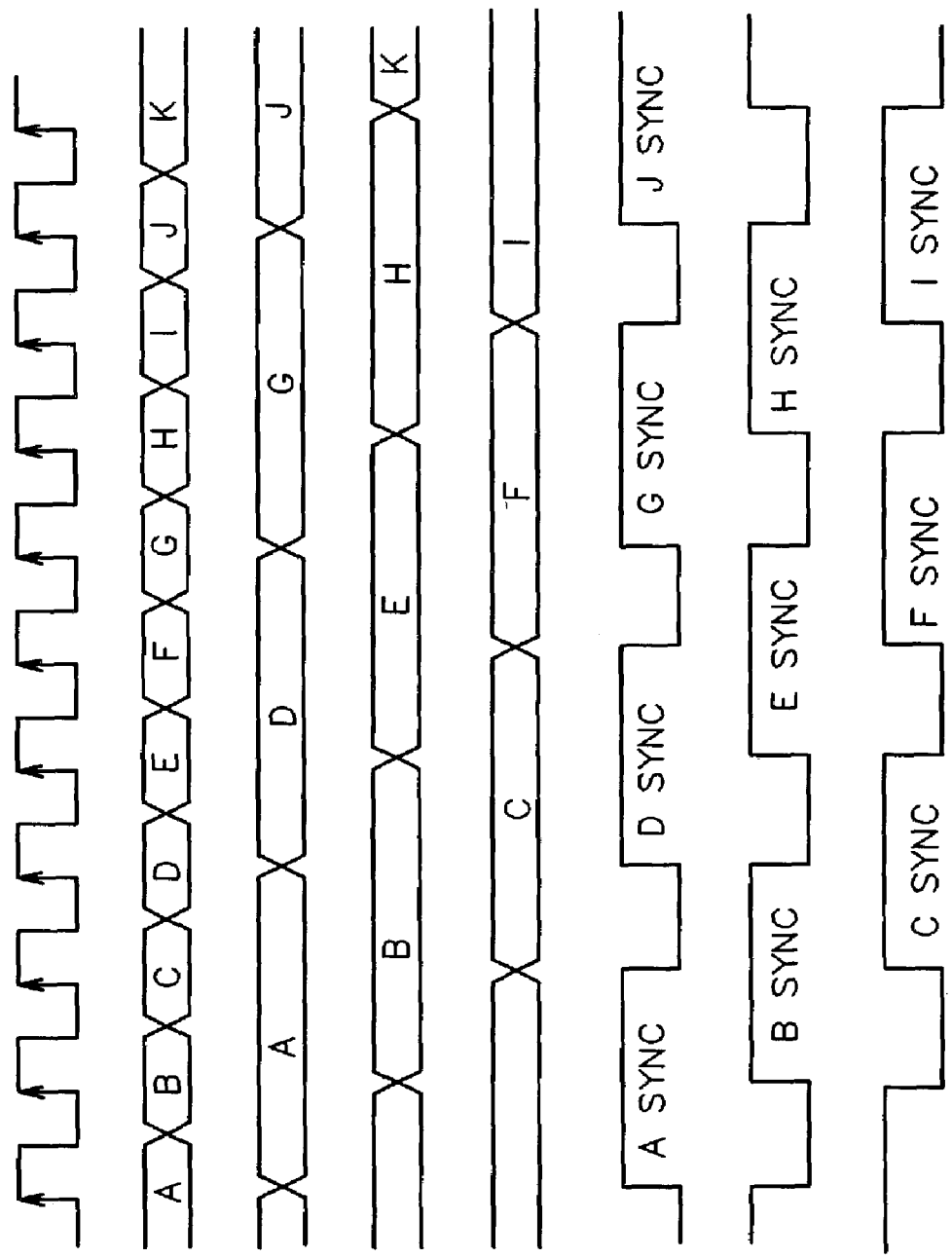
FIG. 10B is a diagram illustrating a synchronization technique implemented in the terminal unit of FIG. 10A.

Similarly, as shown in FIG. 10A, at a controller 32T of a non-end node terminal unit, a 50 MHz reference oscillator 31T drives the controller, which in turn outputs a divided-by-two transceiver reference clock 35T of 25 MHz that is initially applied to the respective transceivers $36A_T$ and $36B_T$. In this embodiment, the controller 32T is configured to detect when the RX_CLK of a given transceiver becomes active, and then switch the active RX_CLK to drive the reference clock input of the other transceiver of the terminal unit, retaining isochronicity. As shown in FIG. 10B, each different 25 MHz domain is synchronized to an adjacent domain using a scheme of multiple stages of metastability resolving registers (e.g., three registers) which are loaded with transceiver data in a round-robin fashion to allow the data to cross clock domains with ample setup and hold.

In yet another embodiment, a "bit padding" scheme similar to that discussed above in connection with FIG. 6A may provide a technique by which small differences between the speeds of oscillators in different terminal units of a digital audio snake may be reconciled. In one aspect of this embodiment, various bit padding or synchronization codes may be included in the "in-band" signaling portion of one or more TDM time slot channels assigned to a given digital audio-related signal to be transported. For example, in one aspect of this embodiment, the controller of a given terminal unit may encode information transported in one or more assigned TDM time slot channels of a transmitted TDM stream so as to contain a status bit for each data bit of a sampled digital audio signal. The status bit may be used to provide any number of indications to the controller that receives the TDM stream; in one example, similar to that discussed above in connection with FIG. 6A, the status bit may be used to indicate whether the data bit is a new valid data bit or merely a padding bit to account for the difference between the effective bit rate of the assigned TDM channel(s) and the actual digital audio bit rate. The status bit is used on the receiving end to differentiate between pad bits and actual data bits, thereby facilitating recovery of the digital audio signal. In yet another aspect of this embodiment, a counter-propagating TDM bit stream received by the controller may include similar status bits that provide feedback to the controller that the controller may use to control one or more reference clocks for its transceivers. In this manner, differences in clock domains throughout a signal chain, and/or differences between effective TDM channel bit rates and actual bit rates of digital audio-related signal, may be compensated via a configuration involving feedback between terminal units.

4. Transporting Other Tapes of Audio-Related Signals

As discussed above, different types of audio-related signals other than IEC 958 signals may be transported by the terminal units of the digital audio snake shown in FIG. 1. In one embodiment of the invention, the TDM bit stream format 50 shown in FIG. 5 and the protocol given above in Table 1 may be used to accommodate transport of several different types of audio-related signals (as well as audio signals having different data rates) in addition to, or instead of, IEC 958 signals. In general, it should be appreciated that the TDM format 50 and the protocol of Table 1 may be used to simultaneously transport different types and rates of encoded digital audio-related signals. Additionally, several of the concepts discussed above in connection with FIGS. 6A, 6B, 7A, 7B and 8, as well as the other figures, are applicable to the transport of audio-related signals other than IEC 958 signals, some examples of which are discussed below. These examples are provided primarily for purposes of illustration, as the invention is not limited to transporting only the signals discussed herein.

A. Alesis ADAT® Digital Audio Signals

The Alesis ADAT® protocol, developed by Alesis Semi-conductor, 1255 Jefferson Blvd., Suite 285, Los Angeles, Calif. 90066, conventionally is employed to transport multiple channels of digital audio information serially between a transmitting digital audio tape recorder and a plurality of receiving recording units. This is generally accomplished in Alesis products via optical connections. The Alesis ADAT® protocol is described in detail in U.S. Pat. No. 5,297,181, entitled "Method and Apparatus for Providing a Digital Audio Interface Protocol," issued Mar. 22, 1994, and hereby incorporated herein by reference. Optical transmitters and receivers generally employed to transport digital audio signals encoded using the Alesis ADAT® optical format and manufactured by Alesis (e.g., the AL 1401A Optical Generator and AL 1402 Optical Receiver) are discussed in various literature and product spec sheets for these devices (also incorporated herein by reference).

As discussed in U.S. Pat. No. 5,297,181, the Alesis ADAT® protocol includes a 10-bit sync pulse that marks the beginning of a frame in the protocol. In one embodiment of the present invention, this 10-bit sync pulse is used in a manner similar to the BMC violation of IEC 958 signal preambles to determine a data or sampling rate of the Alesis ADAT® digital audio signal to be transported. According to the Alesis protocol, digital audio signals may have a data rate of 44.1 kHz or 48 kHz.

With reference again now to FIG. 5, an Alesis ADAT® digital audio signal is assigned to four time slot channels of the 16 time slot channels of a subframe. Pursuant to the protocol given in Table 1 above, an Alesis ADAT® signal is indicated in the assigned time slot channels by the presence of the 4-bit code "1001", which indicates a data type other than an IEC 958 signal. To particularly indicate an Alesis ADAT® signal, the other data type code "1001" is followed in the subsequent time slots of the assigned channels by the 4-bit nibble "0000", and another 4-bit nibble, either "0000" for a 44.1 kHz signal, or "0001" for a 48 kHz signal.

In the following time slots of the assigned time slot channels, every two data bits of the Alesis ADAT® signal, excluding every fifth data bit, are grouped into one of the corresponding 4-bit nibbles indicated in the first column of Table 1, so as to encode the actual data bits of the Alesis ADAT® signal. The exclusion of every fifth data bit of the Alesis ADAT® signal is to remove clocking bits of the ADAT® protocol that occur every fifth bit, as discussed in U.S. Pat. No. 5,297,181. In one aspect of this embodiment, input ADAT® signals are sampled at 100 MHz, although other sampling rates are possible. Once the Alesis ADAT® initial digital audio signal is encoded pursuant to this scheme, the encoded data is processed by the controller of a given terminal unit in a manner similar to that discussed above in connection with FIG. 6B (e.g., see Acts 100, 102, 104, 106 and 108).

Upon receiving a TDM stream transporting an encoded Alesis ADAT® signal, the controller of a terminal unit receiving such a TDM stream determines the signal type and data rate by recovering from the assigned time slot channels the three nibble sequence 1001 (other data type), 0000 (Alesis ADAT® format), and 0000 (44.1 kHz) or 0001 (48 kHz). The controller then begins to generate an output signal pursuant to the Alesis ADAT® protocol corresponding to the decoded data rate. The controller accomplishes this by first generating the 10-bit sinc pulse and the 1-bit end of the sinc pulse delimiter pursuant to the Alesis ADAT® protocol. The controller then delivers the rest of the regenerated signal by loading a four bit shift register with the data from two four bit nibbles recovered from the TDM stream and decoded pursuant to the protocol of Table 1. The bits of the regenerated signal are shifted out of the shift register pursuant to a timing algorithm that uses interpolation tables in a manner similar to that discussed above in connection with FIGS. 7A and 7B.

B. Tascam TDIF™ Digital Audio-Signals

An encoded Tascam TDIF™ signal multiplexed on a TDM stream is identified in a manner similar to that discussed above in connection with an Alesis ADAT® signal. In is particular, again referring to the protocol given in Table 1, a Tascam TDIF™ signal is assigned to four time slot channels of a 16 channel subframe, and is identified by the three nibble sequence "1001" (other data type), "0001" (Tascam TDIF™ format), and either "0000" (44.1 kHz) or "0001" (48 kHz). A certain amount of data is then encoded into subsequent consecutive slots of the assigned time slot channels pursuant to the first column of Table 1. A terminal unit receiving the TDM stream encoded with a Tascam TDIF™ signal recovers the encoded information from the appropriate assigned time slot channels, decodes it, and regenerates the signal in a manner similar to that discussed above in connection with the Alesis ADAT® signal.

C. Other Digital Signals Related to Audio

MIDI signals, SMPTE time code signals and word clock operate at a rate that is appreciably slower than the above-discussed digital audio signals. Hence, for purposes of the following discussion, these types of signals are referred to generally as "slow real time signals." In one embodiment of the invention, slow real time signals can be sampled by a terminal unit controller and the sampled values, rather than encoded values pursuant to Table 1, can be multiplexed directly on one or more TDM streams. Moreover, according to one aspect of this embodiment, several of these types of signals may be transported in one time slot channel of a 16-channel subframe of the TDM stream format shown in FIG. 5.

For example, in one embodiment, consecutive time slots of a given time slot channel assigned to multiple slow real time signals may be configured to hold four different nibbles, each carrying the current state of two signals. Specifically, if a sample of a given slow real time signal N is given by $X_N$, four consecutive nibbles of the assigned time slot channel may be configured as $00X_1X_2$, $00X_3X_4$, $00X_5X_6$, and $00X_7X_8$ (following the protocol given in the first column of Table 1 above). This arrangement causes the data in each of the eight signals (N=1, 2, 3 . . . 8) effectively to be sampled every 64 time slots of the TDM stream, which at a TDM bit stream rate of 100 Mbs is approximately once every 2.56 microseconds.

For terminal units receiving the TDM stream transporting multiplexed slow real time signals, a stream of real time data is recognized by lack of either any IEC 958 preamble codes or the other data code "1001" given by the protocol in Table 1. MIDI signals use an asynchronous protocol with one start bit, eight data bits and one stop bit. Each bit is 32 microseconds long, yielding a 31.25 K baud rate. The clock accuracy for such signals is specified as plus or minus 1%. Since a UART mechanism conventionally is employed for MIDI signals, the acceptable jitter allowable is plus or minus 1% of 320 microseconds, which is 3.2 microseconds per bit time. The sample period of 2.56 microseconds, plus the interframe gap, start of frame slot, and preamble slots (an additional 1.08 microseconds) is more than this. Therefore, several microseconds of sample time are buffered, so that the incoming jitter can be removed and the MIDI data retimed to a bit time of exactly 32 microseconds per bit. There is no need for a timing algorithm using an interpolation table, since the data is asynchronous from one 10-bit sequence to the next.

SMPTE time code is even slower than MIDI signals. For audio applications, the most common method is LTC, with 80 bits of BMC encoded data stretched to occupy a frame, at a frame speed of 30 frames per second, which is 2400 bits per second. Moreover, a low pass filter is mandated for the SMPTE time code signal. The specified rise and fall times for the signal are 25 microseconds plus or minus 5 microseconds. The low pass filter is a 6 dB per octave first order filter with a time constant of a 11.5 microseconds, which corresponds to a –3 dB cutoff frequency of 14 kHz. The sample period of 2.56 microseconds plus the additional interval of 1.08 microseconds (interframe gap, start and preamble slots) adds up to a maximum jitter of 3.64 microseconds peak-to-peak, which corresponds to an FM component of approximately 275 kHz. Since this is attenuated by the low pass filter to the point of being negligible, the sampled data can be output as is, with no buffering or additional signal shaping in the time domain.

Word clock is a square wave with 50% duty cycle and has a frequency equal to the audio sample rate (44.1 kHz, 48 kHz, or 96 kHz). It needs to have minimal jitter, because it is used to clock every sample in the system that it drives. Therefore, it requires interpolation tables that are employed in a manner similar to that discussed above in connection with FIGS. 7A and 7B. However, because the word clock is sufficiently slow, the timing algorithm using interpolation tables for work clock differs from the timing algorithm used for IEC 958, Alesis ADAT®, and Tascam TDIF™ signals in that interpolation table entries are not added to or subtracted from the timing algorithm based on the FIFO elasticity buffer watermark. Instead, the various interpolation table values in each sequence are modified in units of plus or minus 10 nanoseconds as needed, in response to the FIFO watermark.

Tables 6A, 6B and 6C below show interpolation table values and a timing algorithm analysis for word clocks at each of a 44.1 kHz, 48 kHz and 96 kHz data rate.

TABLE 6A

Word Clock 44.1 kHz Timing Algorithm Interpolation Analysis

| Interpolation Table Entry No. | Entry Value (nanoseconds) | Cumulative Bit Time (nanoseconds) | "Ideal" Cumulative Bit Time (nanoseconds) | Δ (ppm) |
|---|---|---|---|---|
| 1 | 11340 | 11340 | 11337.868 | +188 |
| 2 | 11340 | 22680 | 22675.737 | +188 |
| 3 | 11330 | 34010 | 34013.605 | −106 |
| 4 | 11340 | 45350 | 45351.474 | −33 |
| 5 | 11340 | 56690 | 56689.342 | +12 |

TABLE 6B

Word Clock 48 kHz Timing Algorithm Interpolation Analysis

| Interpolation Table Entry No. | Entry Value (nanoseconds) | Cumulative Bit Time (nanoseconds) | "Ideal" Cumulative Bit Time (nanoseconds) | Δ (ppm) |
|---|---|---|---|---|
| 1 | 10420 | 10420 | 10416.667 | +320 |
| 2 | 10410 | 20830 | 20833.333 | +160 |
| 3 | 10420 | 31250 | 31250.000 | 0 |

TABLE 6C

Word Clock 96 kHz Timing Algorithm Interpolation Analysis

| Interpolation Table Entry No. | Entry Value (nanoseconds) | Cumulative Bit Time (nanoseconds) | "Ideal" Cumulative Bit Time (nanoseconds) | Δ (ppm) |
|---|---|---|---|---|
| 1 | 5210 | 5210 | 5208.333 | +320 |
| 2 | 5210 | 10420 | 10416.667 | +320 |
| 3 | 5210 | 15630 | 15625.000 | +320 |
| 4 | 5200 | 20830 | 20833.333 | −160 |
| 5 | 5210 | 26040 | 26041.667 | −64 |
| 6 | 5210 | 31250 | 31250.000 | 0 |

For example, with reference to Table 6C above, to make the 96 kHz word clock timing algorithm (using the sequence of six interpolation table entries) run 320 parts per million faster, value of the first table entry would be changed from 5210 nanoseconds to 5200 nanoseconds. To make it run 320 parts per million slower, the fourth value would be changed from 5200 nanoseconds to 5210 nanoseconds. To make it run 640 parts per million slower, there would be one 5220 nanosecond value in the sequence of six table entries, with five other values at 5210 nanoseconds. This technique may be applied similarly to the interpolation tables for the other data rates.

As discussed above, eight slow real time signals may be multiplexed in the bandwidth of one TDM time slot channel of the format shown in FIG. 5, yielding a theoretical maximum of 128 signals (16 time slot channels×8 signals/channel) being carried by a TDM stream. In theory, however, there exists a total potential bandwidth in a 100 Mbs TDM stream for over 500 word clocks or 1600 MIDI signals or over 20,000 SMPTE time code signals using TDM formats other than those indicated in FIG. 5.

5. CONCLUSION

While many of the concepts disclosed herein have been discussed in connection with a digital audio snake implementation including a number of terminal units (as illustrated in FIG. 1), it should be appreciated that the invention is not limited in this respect. In particular, according to other embodiments, components configured to implement various functions discussed herein may be employed in, integrated with, or otherwise associated with a variety of professional audio products, such that this functionality is "embedded" in these products.

For example, one embodiment of the invention is directed to a digital sound mixing system including one or more controllers as discussed herein. In one aspect of this embodiment, a number of such digital sound mixing systems may be coupled to create a comprehensive live sound reproduction and recording system. In particular, in one implementation of this concept, a first digital sound mixing system according to this embodiment may be located near a performance stage to provide a stage monitor mix of the performance. This first digital sound mixing system may be linked (e.g., via CAT5 cable, fiber optic cable, or wireless links) to a second digital sound mixing system in the audience, including one or more controllers as discussed herein, that provides the live sound mix. The second digital sound mixing system in turn may be similarly coupled to a third digital sound mixing system located in a recording space (e.g., behind the performance area) to provide a recording mix, which is fed to a multi-track recorder; both the third mixing system and the multi-track recorder also include one or more controllers as discussed above. The third digital sound mixing system also may be similarly coupled to a fourth digital mixing system (including one or more controllers) in a video production truck located outside the building to produce a soundtrack for a video recording of the live performance. From the foregoing, it should be readily appreciated that a wide variety of sound processing applications may be facilitated by the various concepts discussed herein.

Having thus described several illustrative embodiments of the invention, various alterations, modifications, and improvements will readily occur to those skilled in the art. Such alterations, modifications, and improvements are intended to be within the spirit and scope of the invention. While some examples presented herein involve specific combinations of functions or structural elements, it should be understood that those functions and elements may be combined in other ways according to the present invention to accomplish the same or different objectives. In particular, acts, elements and features discussed in connection with one embodiment are not intended to be excluded from a similar or other roles in other embodiments. Accordingly, the foregoing description is by way of example only, and is not intended as limiting.

Use of ordinal terms such as "first," "second," "third," etc., in the claims to modify a claim element does not by itself connote any priority, precedence, or order of one claim element over another or the temporal order in which acts of a method are performed. Rather, these terms are used merely as labels to distinguish one claim element having a certain name from another element having a same name (but for use of the ordinal term) to distinguish the claim elements.

What is claimed is:

1. A method for transporting at least one digital audio-related signal of a first bit rate, comprising acts of:
   a) controlling at least one packet-based physical layer transmitter to cause the at least one packet-based physical layer transmitter to generate at least one time division multiplexed (TDM) serial bit stream of a second bit rate, wherein the first bit rate is associated with a first oscillator, the second bit rate is associated with a second oscillator and the first and second bit rates differ in response to a difference between the first oscillator and the second oscillator; and
   b) transporting a representation of the at least one digital audio-related signal in at least one assigned time slot channel of the at least one TDM serial bit stream over a non-packet based, non-circuit switched local area connection including selectively buffering, in response to a difference between the first bit rate and the second bit rate, at least a portion of the representation of the at least one digital audio-related signal so as to at least partially compensate for the difference between the first bit rate and the second bit rate and;
   c). selectively inserting, in response to the difference between the first bit rate and the second bit rate, at least some padding information in the representation of the at least one digital audio-related signal so as to at least partially compensate for the difference between the first bit rate and the second bit rate.

2. The method of claim 1, wherein the at least one TDM stream is transported from a first location to at least one second location, and wherein the act a) includes an act of: generating the at least one TDM stream without utilizing a master clock that is common to the first and second locations.

3. The method of claim 1, wherein the at least one TDM stream is transported from a first location to at least one second location, and wherein the act a) includes an act of: generating the at least one TDM stream at the first location without receiving any timing or synchronization information from the second location.

4. The method of claim 1, further comprising an act of: c) transporting the at least one TDM serial bit stream over at least one of a fiber optic medium and a category 5 (CAT5) cable coupled to the at least one packet-based transmitter.

5. The method of claim 1, further comprising an act of: c) transporting the at least one TDM serial bit stream over air via a wireless carrier.

6. The method of claim 1, wherein the at least one packet-based physical layer transmitter includes at least one Ethernet transmitter, and wherein the act a) includes an act of:
   a1) generating the at least one TDM serial bit stream using the at least one Ethernet transmitter.

7. The method of claim 1, wherein: the act a) includes an act of controlling at least two packet-based physical layer transmitters so as to generate at least first and second counter-propagating TDM bit streams; and the act b) includes acts of: transporting a first representation of the at least one digital audio-related signal in at least one assigned time slot channel of the first TDM serial bit stream; and transporting a second representation of the at least one digital audio-related signal in at least one assigned time slot channel of the second TDM serial bit stream.

8. The method of claim 1, wherein the at least one digital audio-related signal includes at least first and second digital audio-related signals having different data rates, and wherein the act b) includes acts of: transporting a representation of the first digital audio-related signal in at least one first assigned time slot channel of the at least one TDM serial bit stream; and transporting a representation of the second digital audio-related signal in at least one second assigned time slot channel of the at least one TDM serial bit stream.

9. The method of claim 1, wherein the at least one digital audio-related signal includes at least first and second digital audio-related signals having different data protocols, and wherein the act b) includes acts of: transporting a representation of the first digital audio-related signal in at least one first assigned time slot channel of the at least one TDM serial bit stream; and transporting a representation of the second digital audio-related signal in at least one second assigned time slot channel of the at least one TDM serial bit stream.

10. The method of claim 1, wherein the representation of the at least one digital audio-related signal includes at least data and other information relating to the at least one digital audio-related signal, and wherein the method further comprises acts of: d) placing the other information in at least some time slots of the assigned at least one time slot channel; and e) placing the data in other time slots of the assigned at least one time slot channel.

11. The method of claim 10, wherein the other information includes data rate information related to a data rate of the at least one digital audio-related signal, and wherein the act d) includes an act of: placing the data rate information in the at least some time slots of the assigned at least one time slot channel.

12. The method of claim 10, wherein the other information includes data type information related to a data protocol of the at least one digital audio-related signal, and wherein the act d) includes an act of: placing the data type information in the at least some time slots of the assigned at least one time slot channel.

13. The method of claim 10, wherein the other information includes data timing information relating to multiple clock domains that receive and transmit the at least one TDM serial bit stream, and wherein the act d) includes an act of: placing the data timing information in the at least some time slots of the assigned at least one time slot channel.

14. The method of claim 1, wherein the first oscillator and the second oscillator operate at the same frequency.

15. The method of claim 1 wherein the first oscillator and the second oscillator operate at different frequencies.

16. The method of claim 1, further comprising acts of: receiving the at least one TDM serial bit stream via at least one packet-based physical layer receiver; and re-transmitting the at least one received TDM serial bit stream via at least one second packet-based physical layer transceiver.

17. The method of claim 1, further comprising acts of: controlling at least one packet-based physical layer receiver so as to receive the at least one TDM serial bit stream; recovering the representation of the at least one digital audio-related signal from the at least one received TDM serial bit stream; and re-generating the at least one digital audio-related signal based on the recovered representation of the at least one second digital audio-related signal.

18. The method of claim 1, wherein the at least one digital audio-related signal includes a first digital audio-related signal and a second digital audio-related signal, and wherein: the act a) includes an act of controlling the at least one packet-based physical layer transmitter so as to generate at least one first time division multiplexed (TDM) serial bit stream; and the act b) includes an act of transporting a representation of the at least one first digital audio-related signal in at least one assigned time slot channel of the at least one first TDM serial bit stream, and wherein the method further comprises acts of: receiving at least one second TDM serial bit stream via at least one packet-based physical layer receiver; recovering a representation of the at least one second digital audio-related signal from the at least one received second TDM serial bit stream; and generating the at least one second digital audio-related signal based on the recovered representation of the at least one second digital audio-related signal.

19. A method for transporting at least one digital audio-related signal having a first bit rate associated with a first oscillator, comprising acts of:

a) controlling at least one packet-based physical layer receiver so as to receive at least one TDM serial bit stream from a non-packet based, non-circuit switched local area connection, where the at least one TDM serial bit stream includes a representation of the at least one digital audio-related signal in at least one assigned time slot channel having a second bit rate associated with a second oscillator;

b) recovering the representation of the at least one digital audio-related signal from the at least one received TDM serial bit stream including selectively buffering, in response to a difference between the first bit rate and the second bit rate, at least a portion of the recovered representation of the at least one digital audio related signal to at least partially compensate for the difference between the first bit rate and the second bit rate, wherein the representation of the at least one digital audio-related signal includes, in response to a difference between the first bit rate and the second bit rate, padding information that facilitates at least a partial compensation for the difference between the first bit rate and second bit rate, and wherein the first and second bit rates differ in response to a difference between the first oscillator and the second oscillator; and c) generating the at least one digital audio-related signal based on the recovered representation of the at least one digital audio-related signal.

20. The method of claim 19, including an act of: discarding the padding information from the recovered representation of the at least one digital audio-related signal.

21. The method of claim 19, wherein: the first oscillator and the second oscillator operate at the same frequency.

22. The method of claim 19, wherein the act of generating the at least one digital audio-related signal further includes an act of: generating the at least one digital audio-related signal at essentially the first bit rate based on the recovered representation after buffering in the act.

23. The method of claim 22, wherein the step of generating the at least one digital audio-related signal at essentially the first bit rate includes the steps of reading the recovered representation from an elasticity buffer; decoding the recovered representation read from the elasticity buffer to obtain bits of the digital audio-related signal; loading the bits into a shift register; and clocking the bits out of the shift register based on at least one variable timing algorithm so as to re-generate the at least one digital audio-related signal at essentially the first bit rate.

24. The method of claim 23, wherein the act of clocking the bits out of the shift register includes an act of: adjusting the at least one variable timing algorithm based on a watermark of the elasticity buffer.

25. An apparatus for transporting at least one digital audio-related signal having a first bit rate associated with a first oscillator, the apparatus comprising:

at least one packet-based physical layer transmitter; and at least one controller configured to control the at least one packet-based physical layer transmitter to cause the at least one packet-based physical layer transmitter to generate at least one time division multiplexed (TDM) serial bit stream for transport over a non-packet based, non-circuit switched local area connection, the TDM serial bit stream having a second bit rate associated with a second oscillator, the at least one controller further configured to place a representation of the at least one digital audio-related signal in at least one assigned time slot channel of the at least one TDM serial bit stream, wherein the at least one controller is configured to selectively buffer, in response to a difference between the first bit rate and the second bit rate, at least a portion of the representation of the at least one digital audio-related signal so as to at least partially compensate for the difference between the first bit rate and the second bit rate resulting from a difference between the first oscillator and the second oscillator and to selectively insert, in response to the difference between the first bit rate and the second bit rate, at least some padding information in the representation of the at least one digital audio-related signal so as to at least partially compensate for the difference between the first bit rate and the second bit rate.

26. The apparatus of claim 25, wherein the at least one TDM stream is transported from a first location to at least one second location, and wherein the apparatus is configured to generate the at least one TDM stream without utilizing a master clock that is common to the first and second locations.

27. The apparatus of claim 25, wherein the at least one TDM stream is transported is from a first location to at least one second location, and wherein the apparatus is configured to generate the at least one TDM stream at the first location without receiving any timing or synchronization information from the second location.

28. The apparatus of claim 25, wherein the at least one packet-based transmitter is configured to transmit the at least one TDM serial bit stream via at least one of a fiber optic medium and a category 5 (CAT5) cable.

29. The apparatus of claim 25, wherein the at least one packet-based transmitter is configured to transmit the at least one TDM serial bit stream over air via a wireless carrier.

30. The apparatus of claim 25, wherein the at least one packet-based physical layer transmitter includes at least one Ethernet transmitter.

31. The apparatus of claim 25, wherein: the at least one packet-based physical layer transmitter includes at least two packet-based physical layer transmitters; and the at least one controller is configured to control the at least two packet-based physical layer transmitters so as to generate at least first and second counter-propagating TDM bit streams, the at least one controller further configured to place a first representation of the at least one digital audio-related signal in at least one assigned time slot channel of the first TDM serial bit stream, and place a second representation of the at least one digital audio-related signal in at least one assigned time slot channel of the second TDM serial bit stream.

32. The apparatus of claim 25, wherein the at least one digital audio-related signal includes at least first and second digital audio-related signals having different data rates, and wherein the at least one controller is configured to place a representation of the first digital audio-related signal in at least one first assigned time slot channel of the at least one TDM serial bit stream, and place a representation of the second digital audio-related signal in at least one second assigned time slot channel of the at least one TDM serial bit stream.

33. The apparatus of claim 25, wherein the at least one digital audio-related signal includes at least first and second digital audio-related signals having different data protocols, and wherein the at least one controller is configured to place a representation of the first digital audio-related signal in at least one first assigned time slot channel of the at least one TDM serial bit stream, and place a representation of the second digital audio-related signal in at least one second assigned time slot channel of the at least one TDM serial bit stream.

34. The apparatus of claim 25, wherein the representation of the at least one digital audio-related signal includes at least data and other information relating to the at least one digital audio-related signal, and wherein the at least one controller is configured to place the other information in at least some time slots of the assigned at least one time slot channel, and place the data in other time slots of the assigned at least one time slot channel.

35. The apparatus of claim 34, wherein the other information includes data rate information related to a data rate of the at least one digital audio-related signal, and wherein the at least one controller is configured to place the data rate information in the at least some time slots of the assigned at least one time slot channel.

36. The apparatus of claim 34, wherein the other information includes data type information related to a data protocol of the at least one digital audio-related signal, and wherein the at least one controller is configured to place the data type information in the at least some time slots of the assigned at least one time slot channel.

37. The apparatus of claim 34, wherein the other information includes data timing information relating to multiple clock domains that receive and transmit the at least one TDM serial bit stream, and wherein the at least one controller is configured to place the data timing information in the at least some time slots of the assigned at least one time slot channel.

38. The apparatus of claim 25, wherein the first oscillator and the second oscillator operate at either the same frequency or at different frequencies.

39. The apparatus of claim 25, wherein the first oscillator and the second oscillator operate at the different frequencies.

40. The apparatus of claim 25, further comprising: at least one packet-based physical layer receiver configured to receive the at least one TDM serial bit stream; and at least one second packet-based physical layer transmitter coupled to the at least one packet-based physical layer receiver and configured to re-transmit the at least one received TDM serial bit stream.

41. The apparatus of claim 25, further comprising: at least one packet-based physical layer receiver configured to receive the at least one TDM serial bit stream; and at least one second controller configured to control the at least one packet-based physical layer receiver so as to recover the representation of the at least one digital audio-related signal from the at least one received TDM serial bit stream and re-generate the at least one digital audio-related signal.

42. The apparatus of claim 25, further comprising at least one packet-based physical layer receiver, wherein: the at least one digital audio-related signal includes a first digital audio-related signal and a second digital audio-related signal; and the at least one controller is configured to: control the at least one packet-based physical layer transmitter so as to generate at least one first time division multiplexed (TDM) serial bit stream; place a representation of the at least one first digital audio-related signal in at least one assigned time slot channel of the at least one first TDM serial bit stream; control the at least one packet-based physical layer receiver to receive at least one second TDM serial bit stream; recover a representation of the at least one second digital audio-related signal from the at least one received second TDM serial bit stream; and generate the at least one second digital audio-related signal based on the recovered representation of the at least one second digital audio-related signal.

43. An apparatus for transporting at least one digital audio-related signal having a first bit rate associated with a first oscillator, the apparatus comprising:
   at least one packet-based physical layer receiver configured to receive at least one TDM serial bit stream from a non-packet based, non-circuit switched local area connection, where the at least one TDM serial bit stream has a second bit rate associated with a second oscillator and includes a representation of the at least one digital audio-related signal in at least one assigned time slot channel; and
   at least one controller configured to recover the representation of the at least one digital audio-related signal from the at least one received TDM serial bit stream and generate the at least one digital audio-related signal based on the recovered representation, wherein the representation of the at least one digital audio-related signal includes padding information, selectively added in response to a difference between the first bit rate and the second bit rate, that facilitates at least a partial compensation for the difference between the first bit rate and the second effective bit rate resulting from differences between the first oscillator and the second oscillator, and wherein the at least one controller is configured to discard the padding information from the recovered representation of the at least one digital audio-related signal.

44. The apparatus of claim 43, wherein the first oscillator operates at either the same as the second oscillator or at a different frequency than the second oscillator.

45. The apparatus of claim 43, wherein the at least one controller is configured to buffer at least a portion of the recovered representation of the at least one digital audio-related signal so as to at least partially compensate for a difference between the first bit rate and the second bit rate.

46. The apparatus of claim 45, wherein the at least one controller is configured to generate the at least one digital audio-related signal at essentially the first bit rate based on the recovered representation after buffering.

47. The apparatus of claim 46, wherein the at least one controller includes: at least one elasticity buffer; and at least one shift register, and wherein the at least one controller is configured to: read the recovered representation from the at least one elasticity buffer; decode the recovered representation read from the at least one elasticity buffer to obtain bits of the digital audio-related signal; load the bits into the at least one shift register; and clock the bits out of the at least one shift register based on at least one variable timing algorithm so as to generate the at least one digital audio-related signal at essentially the first bit rate.

48. The apparatus of claim 47, wherein the at least one controller is configured to adjust the at least one variable timing algorithm based on a watermark of the at least one elasticity buffer.

49. An apparatus for transporting at least one digital audio-related signal having a first bit rate associated with a first oscillator, the apparatus comprising:
a) at least one first terminal unit, comprising:
at least one first controller configured to receive at least one digital audio-related signal and to assign the at least one digital audio-related signal to at least one time slot channel of a time division multiplexed (TDM) serial bit stream to provide a representation of the at least one audio-related signal;
at least one packet-based physical layer transmitter, responsive to the at least one first controller and configured to generate the TDM serial bit stream the generated TDM serial bit stream having a second bit rate associated with a second oscillator;
selectively buffering, in response to a difference between the first bit rate and the second bit rate, at least a portion of the representation of the at least one digital audio-related signal so as to at least partially compensate for the difference between the first bit rate and the second bit rate resulting from a difference between the first oscillator and the second oscillator; and
selectively inserting, in response to the difference between the first bit rate and the second bit rate, at least some padding information in the representation of the at least one digital audio-related signal so as to at least partially compensate for the difference between the first bit rate and the second bit rate and
at least one first communication port, coupled to the at least one transmitter and configured to output the TDM serial bit stream over a non-packet based, non-circuit switched local area connection;
b) at least one second terminal unit, comprising: at least one second communication port configured to receive the TDM serial bit stream from the non-packet based, non-circuit switched local area connection; at least one packet-based physical layer receiver, coupled to the at least one second communication port and configured to process the received TDM serial bit stream and output information based on the received TDM serial bit stream; and at least one second controller, coupled to the at least one receiver and configured to process the information so as to regenerate the at least one digital audio-related signal; and
c) at least one communication medium coupled to the at least one first communication port and the at least one second communication port to transport the TDM serial bit stream.

50. The apparatus of claim 49, wherein each of the at least one packet-based physical layer transmitter and the at least one packet-based physical layer receiver includes an Ethernet transceiver.

51. The apparatus of claim 50, wherein the at least one communication medium includes a category 5 (CAT5) cable.

52. The apparatus of claim 50, wherein the at least one communication medium includes at least one fiber optic medium.

53. The apparatus of claim 50, wherein the at least one communication medium includes at least one wireless medium.

54. The apparatus of claim 50, wherein: the at least one first terminal unit includes at least two Ethernet transceivers coupled to the at least one first controller and configured to transmit and receive counter-propagating TDM bit streams carrying a plurality of digital audio-related signals; and the at least one second terminal unit includes at least two Ethernet transceivers coupled to the at least one second controller and configured to transmit and receive the counter-propagating TDM bit streams carrying the plurality of digital audio-related signals.

55. The apparatus of claim 54, wherein the plurality of digital audio-related signals includes at least two digital audio-related signals having different data rates.

56. The apparatus of claim 55, wherein the first and second controllers are configured such that a first TDM bit stream of the counter-propagating TDM bit streams carries the at least two digital audio-related signals having the different data rates in respective different time slot channels.

57. The apparatus of claim 54, wherein the plurality of digital audio-related signals includes at least two digital audio-related signals having different data protocols.

58. The apparatus of claim 57, wherein the first and second controllers are configured such that a first TDM bit stream of the counter-propagating TDM bit streams carries the at least two digital audio-related signals having the different data protocols in respective different time slot channels.

* * * * *